(12) United States Patent
Yitts

(10) Patent No.: US 8,170,894 B2
(45) Date of Patent: May 1, 2012

(54) METHOD OF IDENTIFYING INNOVATIONS POSSESSING BUSINESS DISRUPTING PROPERTIES

(76) Inventor: Anthony M. Yitts, Grafton, MA (US)

( * ) Notice: Subject to any disclaimer, the term of this patent is extended or adjusted under 35 U.S.C. 154(b) by 882 days.

(21) Appl. No.: 12/238,901

(22) Filed: Sep. 26, 2008

(65) Prior Publication Data

US 2009/0259521 A1 Oct. 15, 2009

Related U.S. Application Data

(60) Provisional application No. 61/044,548, filed on Apr. 14, 2008.

(51) Int. Cl.
*G06Q 10/00* (2006.01)

(52) U.S. Cl. ............... 705/7.11; 705/2; 705/30; 705/35; 705/36 R; 702/66; 702/83; 702/97; 702/179; 709/224

(58) Field of Classification Search ................ None
See application file for complete search history.

(56) References Cited

U.S. PATENT DOCUMENTS

| | | | | |
|---|---|---|---|---|
| 7,117,108 B2 * | 10/2006 | Rapp et al. | ............. | 702/71 |
| 7,447,723 B2 * | 11/2008 | Perng et al. | ............. | 708/422 |
| 7,584,133 B2 * | 9/2009 | Horowitz | ............. | 705/36 R |
| 7,584,134 B2 * | 9/2009 | Horowitz | ............. | 705/36 R |
| 7,593,883 B2 * | 9/2009 | Horowitz | ............. | 705/36 R |
| 7,603,326 B2 * | 10/2009 | Bonabeau et al. | ............. | 706/13 |
| 7,783,694 B2 * | 8/2010 | Perng et al. | ............. | 708/422 |
| 2004/0243328 A1 * | 12/2004 | Rapp et al. | ............. | 702/71 |
| 2005/0125318 A1 * | 6/2005 | Jameson | ............. | 705/30 |
| 2006/0149144 A1 * | 7/2006 | Lynn et al. | ............. | 600/323 |
| 2006/0155206 A1 * | 7/2006 | Lynn | ............. | 600/529 |
| 2006/0155628 A1 * | 7/2006 | Horowitz | ............. | 705/35 |

OTHER PUBLICATIONS

Koch, Sandra Idelle (2000). Empirical evidence of pricing efficiency in niche markets. Ph.D. dissertation, University of North Texas, United States—Texas.*

Anantaram Balakrishnan, Soundar R. T. Kumara, & Shankar Sundaresan. (1999). Manufacturing in the Digital Age: Exploiting Information Technologies for Product Realization. Information Systems Frontiers, 1(1), 25-50.*

Madarshahi, Saeed S. (2006) "Application of Chaos Theory in the Business World, Seeking the Chaos Footprint in Tehran Stock Exchange Index" MBA Thesis—Carleton University (BUSI 5908).*

* cited by examiner

*Primary Examiner* — Lynda Jasmin
*Assistant Examiner* — Gurkanwaljit Singh
(74) *Attorney, Agent, or Firm* — Lambert & Associates; Gary E. Lambert; David J. Connaughton, Jr.

(57) ABSTRACT

The instant invention involves a method for determining the expected presence of disruptive business process innovations by performing various nonlinear dynamic processes and analysis with both expected data values and referenced data values. After processing the necessary data, the method allows for the prediction of said disruptive business processes innovations (i.e. innovations that have a game changing effect on the market or markets to which the innovation belongs). After determining the presence or non-presence of any disruptive business process innovations, the method comprises steps for providing advice to users of said method. Further, the instant invention encompasses variants of its method that are facilitated by the use of at least one computing machine.

14 Claims, 21 Drawing Sheets

METHOD OF IDENTIFYING INNOVATIONS POSSESSING BUSINESS DISRUPTING PROPERTIES

CROSS REFERENCE TO RELATED APPLICATION

This application claims priority to and claims the benefit of the previously filed U.S. provisional patent application, U.S. Application No. 61/044,548, filed on Apr. 14, 2008.

FIELD OF THE INVENTION

The present invention relates generally to methods of predicting the effects of innovations within the dynamic business environment. In particular the method identifies innovations that have a particularly "disruptive" or "game changing" effects on the current business climate ("disruptive" in a positive sense for those business entities that are able to practice or otherwise benefit from the new innovation).

BACKGROUND OF INVENTION

This invention relates to methods of business and economic modeling that rely on mathematical and computer models to predict possible future economic and business activity. These methods often rely upon mathematical algorithms and/or combinations of mathematical algorithms to ascertain an expected future result.

Other methods of economic and business modeling focus on simply detecting the future state of an economic or business system, perhaps to determine when it is wise to invest in stocks, bonds, currency or commodities. At times these models have relied upon rather "straightforward" methods of analysis to arrive at their predictions. In these models input values are entered, run through the series of calculations the model requires and a determination is made regarding the future business and economic state. However, these models are not reflective of a real business and economic system as these systems are dynamic, nonlinear, and "Chaotic".

Dynamically nonlinear systems dominate the inner workings of nature. They determine the interaction of fluids on our planet, thus weather patterns, air and water currents, and influence the natural formation of solid structures. Further, dynamically nonlinear patterns are found in biological systems, from how a tree may grow, to how nerves and blood vessels extend throughout the body of an animal. However, the influence of dynamic nonlinearity is felt outside the realm of nature as well.

It is recognized that societies tend to produce chaotic, nonlinear patterns as well, including macro-economic systems. By recognizing the patterns that exist in these macro-economic systems, it possible to make more accurate predictions regarding what the possible future state of a market may be. Thus, some economic prediction models may adopt non-linearity as a component in their economic and/or market forecasts.

However, even these economic models do not provide business and economic leaders with all the information that may be valuable in their decision making processes. They fail to consider what types of changes caused by new innovations may lead to a fundamental shift in the existing marketplace. Without a model designed to recognize such game changing innovations, the currently existing models fail to address a vitally important business and economic decision making need. The current invention provides such a dynamically nonlinear model to detect such innovations.

Thus, what is needed is an improved business modeling method that detects innovations that have disruptive business effects within an economic/market system allowing for a user to make business decisions with a more complete set of information.

SUMMARY OF THE INVENTION

The instant invention, as illustrated herein, is clearly not anticipated, rendered obvious, or even present in any of the prior art mechanisms, either alone or in any combination thereof. A method of modeling and analyzing dynamic nonlinear economic and business systems for the purpose of determining if there is a substantial likelihood of a new innovative technology having a "disruptive" effect on the current business climate will allow business leaders another important tool to use when making business decisions. Thus the several embodiments of the instant invention are illustrated herein.

Therefore, it is an object of the present invention to overcome the previously mentioned shortcomings found in prior art economic modeling systems and provides a business modeling method for predicting innovations that have a disruptive effect on a business environment.

It is another object of the present invention is to provide a nonlinear business modeling method for predicting innovations that have a disruptive effect on a business environment.

It is another object of the present invention is to provide a dynamic nonlinear business modeling method for predicting innovations that have a disruptive effect on a business environment.

It is another object of the present invention is to provide an improved dynamic nonlinear business modeling method for predicting innovations that have a disruptive effect on a business environment to better inform business decision makers.

It is another object of the present invention is to provide a dynamic nonlinear business modeling method for predicting innovations that have a disruptive effect on a business environment to better inform business decision makers.

It is another object of the present invention is to provide a dynamic nonlinear business modeling method for predicting innovations that have a disruptive effect on a business environment that allows users to enter initial values for analysis.

It is another object of the present invention is to provide a dynamic nonlinear business modeling method for predicting innovations that have a disruptive effect on a business environment that allows users to enter initial values for analysis and processing.

It is another object of the present invention to provide a method for improved disruptive innovation analysis.

It is another object of the present invention to provide a method for improved decision making based on an improved disruptive innovation analysis.

It is another object of the present invention is to provide a dynamic nonlinear business modeling method for predicting innovations that have a disruptive effect on a business environment that utilizes at least one mathematical technique involving nonlinear dynamics (chaos theory) to determine if the innovation scenario under evaluation has dynamic non-linear characteristics.

It is another object of the present invention is to provide a dynamic nonlinear business modeling method for predicting innovations that have a disruptive effect on a business environment that allows users to enter initial values for analysis and processing, such as by a computing machine.

It is another object of the present invention is to provide a dynamic nonlinear business modeling method for predicting innovations that have a disruptive effect on a business environment that allows users to enter initial time series data for analysis and processing, such as by a computing machine, wherein said time series data represents business innovation and references for the innovation under analysis.

It is another object of the present invention is to provide a dynamic nonlinear business modeling method for predicting innovations that have a disruptive effect on a business environment that derives Lyapunov exponents and strange attractors to analyze data under examination for detecting the presence of dynamic nonlinearity (a chaotic system).

It is another object of the present invention is to provide a dynamic nonlinear business modeling method for predicting innovations that have a disruptive effect on a business environment that evaluates the reliability and tendency of dynamic nonlinearity through a method of derivation of indicators.

It is another object of the present invention is to provide a dynamic nonlinear business modeling method for predicting innovations that have a disruptive effect on a business environment that evaluates the reliability and tendency of dynamic nonlinearity through a method of derivation of indicators such as Hurst exponents.

It is another object of the present invention is to provide a dynamic nonlinear business modeling method for predicting innovations that have a disruptive effect on a business environment that evaluates the reliability and tendency of dynamic nonlinearity through a method of derivation of indicators such as Correlation Dimensions.

It is another object of the present invention is to provide a dynamic nonlinear business modeling method for predicting innovations that have a disruptive effect on a business environment that evaluates the reliability and tendency of dynamic nonlinearity through a method of derivation of indicators such as Hurst exponents and Correlation Dimensions.

It is another object of the present invention is to provide a dynamic nonlinear business modeling method for predicting innovations that have a disruptive effect on a business environment that evaluates the reliability and tendency of dynamic nonlinearity through a method of derivation of indicators.

It is another object of the present invention is to provide a dynamic nonlinear business modeling method for predicting innovations that have a disruptive effect on a business environment that evaluates data for structural patterns of dynamic nonlinearity.

It is another object of the present invention is to provide a dynamic nonlinear business modeling method for predicting innovations that have a disruptive effect on a business environment that evaluates data for structural patterns of dynamic nonlinearity through a method of derivation.

It is another object of the present invention is to provide a dynamic nonlinear business modeling method for predicting innovations that have a disruptive effect on a business environment that evaluates data for structural patterns of dynamic nonlinearity through a method of derivation such as a wavelet.

It is another object of the present invention is to provide a dynamic nonlinear business modeling method for predicting innovations that have a disruptive effect on a business environment that evaluates data for structural patterns of dynamic nonlinearity through a method of derivation such as phase space pattern reconstruction.

It is another object of the present invention is to provide a dynamic nonlinear business modeling method for predicting innovations that have a disruptive effect on a business environment that evaluates data for structural patterns of dynamic nonlinearity through a method of derivation such as a wavelet and phase space pattern reconstruction.

It is another object of the present invention is to provide a dynamic nonlinear business modeling method for predicting innovations that have a disruptive effect on a business environment that adapts and interprets the analysis to correlate with a general business model through an optimization method.

It is another object of the present invention is to provide a dynamic nonlinear business modeling method for predicting innovations that have a disruptive effect on a business environment that adapts and interprets the analysis to correlate with a general business model through an optimization method such as an artificial neural network (ANN).

It is another object of the present invention is to provide a dynamic nonlinear business modeling method for predicting innovations that have a disruptive effect on a business environment that adapts and interprets the analysis to correlate with a general business model through an optimization method such as a feedback loop.

It is another object of the present invention is to provide a dynamic nonlinear business modeling method for predicting innovations that have a disruptive effect on a business environment that adapts and interprets the analysis to correlate with a general business model through an optimization method such as an ANN and/or feedback loop.

It is another object of the present invention is to provide a dynamic nonlinear business modeling method for predicting innovations that have a disruptive effect on a business environment that produces analysis output.

It is another object of the present invention is to provide a dynamic nonlinear business modeling method for predicting innovations that have a disruptive effect on a business environment that produces analysis output that requires no theoretical mathematical knowledge to interpret and/or understand.

It is another object of the present invention is to provide a dynamic nonlinear business modeling method for predicting innovations that have a disruptive effect on a business environment that produces graphical analysis output.

It is another object of the present invention is to provide a dynamic nonlinear business modeling method for predicting innovations that have a disruptive effect on a business environment that produces non-graphical analysis output.

It is another object of the present invention is to provide a dynamic nonlinear business modeling method for predicting innovations that have a disruptive effect on a business environment that produces graphical and non-graphical analysis output.

It is another object of the present invention is to provide a dynamic nonlinear business modeling method for predicting innovations that have a disruptive effect on a business environment that produces graphical and non-graphical analysis output that requires no theoretical mathematical knowledge to interpret and/or understand.

It is another object of the present invention is to provide a dynamic nonlinear business modeling method for predicting innovations that have a disruptive effect on a business environment that creates a business innovation scenario for users to compare when considering new business innovation strategy.

It is another object of the present invention is to provide a dynamic nonlinear business modeling method for predicting innovations that have a disruptive effect on a business environment by comparing standard historical data and data that is forecast for a newly introduced business innovation.

It is another object of the present invention is to provide a dynamic nonlinear business modeling method for predicting innovations that have a disruptive effect on a business environment (represented by an expected performance gap) by comparing standard historical data and data that is forecast for an newly introduced business innovation.

It is another object of the present invention is to provide a dynamic nonlinear business modeling method for predicting innovations that have a disruptive effect on a business environment that allows for multiple scenarios for side-by-side comparison of disruptive innovation options to consider acting upon.

It is another object of the present invention is to provide a dynamic nonlinear business modeling method for predicting innovations that have a disruptive effect on a business environment that performs a method for data smoothing processes as necessary.

It is another object of the present invention is to provide a dynamic nonlinear business modeling method for predicting innovations that have a disruptive effect on a business environment that performs a method for data smoothing processes as necessary such as polynomial smoothing.

It is another object of the present invention is to provide a dynamic nonlinear business modeling method for predicting innovations that have a disruptive effect on a business environment that performs a method for data smoothing processes as necessary such as moving average smoothing.

It is another object of the present invention is to provide a dynamic nonlinear business modeling method for predicting innovations that have a disruptive effect on a business environment that performs a method for data smoothing processes as necessary such as moving average smoothing and/or polynomial smoothing.

It is another object of the present invention is to provide a nonlinear business modeling method for automatically predicting innovations that have a disruptive effect on a business environment by the use of a computing machine.

It is another object of the present invention is to provide a dynamic nonlinear business modeling method for automatically predicting innovations that have a disruptive effect on a business environment by the use of a computing machine.

It is another object of the present invention is to provide an improved dynamic nonlinear business modeling method for automatically predicting innovations that have a disruptive effect on a business environment to better inform business decision makers by the use of a computing machine.

It is another object of the present invention is to provide a dynamic nonlinear business modeling method for automatically predicting innovations that have a disruptive effect on a business environment to better inform business decision makers by the use of a computing machine.

It is another object of the present invention is to provide a dynamic nonlinear business modeling method for automatically predicting innovations that have a disruptive effect on a business environment that allows users to enter initial values for analysis by the use of a computing machine.

It is another object of the present invention is to provide a dynamic nonlinear business modeling method for automatically predicting innovations that have a disruptive effect on a business environment that allows users to enter initial values for analysis and processing by the use of a computing machine.

It is another object of the present invention to provide a method for automatically improved disruptive innovation analysis by the use of a computing machine.

It is another object of the present invention to provide a method for automatically improved decision making based on an improved disruptive innovation analysis by the use of a computing machine.

It is another object of the present invention is to provide a dynamic nonlinear business modeling method for automatically predicting innovations that have a disruptive effect on a business environment that utilizes at least one mathematical technique involving nonlinear dynamics (chaos theory) to determine if the innovation scenario under evaluation has dynamic nonlinear characteristics by the use of a computing machine.

It is another object of the present invention is to provide a dynamic nonlinear business modeling method for automatically predicting innovations that have a disruptive effect on a business environment that allows users to enter initial values for analysis and processing, such as by a computing machine by the use of a computing machine.

It is another object of the present invention is to provide a dynamic nonlinear business modeling method for automatically predicting innovations that have a disruptive effect on a business environment that allows users to enter initial time series data for analysis and processing, such as by a computing machine, wherein said time series data represents business innovation and references for the innovation under analysis by the use of a computing machine.

It is another object of the present invention is to provide a dynamic nonlinear business modeling method for automatically predicting innovations that have a disruptive effect on a business environment that derives Lyapunov exponents and strange attractors to analyze data under examination for detecting the presence of dynamic nonlinearity (a chaotic system) by the use of a computing machine.

It is another object of the present invention is to provide a dynamic nonlinear business modeling method for automatically predicting innovations that have a disruptive effect on a business environment that evaluates the reliability and tendency of dynamic nonlinearity through a method of derivation of indicators by the use of a computing machine.

It is another object of the present invention is to provide a dynamic nonlinear business modeling method for automatically predicting innovations that have a disruptive effect on a business environment that evaluates the reliability and tendency of dynamic nonlinearity through a method of derivation of indicators such as Hurst exponents by the use of a computing machine.

It is another object of the present invention is to provide a dynamic nonlinear business modeling method for automatically predicting innovations that have a disruptive effect on a business environment that evaluates the reliability and tendency of dynamic nonlinearity through a method of derivation of indicators such as Correlation Dimensions by the use of a computing machine.

It is another object of the present invention is to provide a dynamic nonlinear business modeling method for automatically predicting innovations that have a disruptive effect on a business environment that evaluates the reliability and tendency of dynamic nonlinearity through a method of derivation of indicators such as Hurst exponents and Correlation Dimensions by the use of a computing machine.

It is another object of the present invention is to provide a dynamic nonlinear business modeling method for automatically predicting innovations that have a disruptive effect on a business environment that evaluates the reliability and tendency of dynamic nonlinearity through a method of derivation of indicators by the use of a computing machine.

It is another object of the present invention is to provide a dynamic nonlinear business modeling method for automatically predicting innovations that have a disruptive effect on a business environment that evaluates data for structural patterns of dynamic nonlinearity by the use of a computing machine.

It is another object of the present invention is to provide a dynamic nonlinear business modeling method for automatically predicting innovations that have a disruptive effect on a business environment that evaluates data for structural patterns of dynamic nonlinearity through a method of derivation by the use of a computing machine.

It is another object of the present invention is to provide a dynamic nonlinear business modeling method for automatically predicting innovations that have a disruptive effect on a business environment that evaluates data for structural patterns of dynamic nonlinearity through a method of derivation such as a wavelet by the use of a computing machine.

It is another object of the present invention is to provide a dynamic nonlinear business modeling method for automatically predicting innovations that have a disruptive effect on a business environment that evaluates data for structural patterns of dynamic nonlinearity through a method of derivation such as phase space pattern reconstruction by the use of a computing machine.

It is another object of the present invention is to provide a dynamic nonlinear business modeling method for automatically predicting innovations that have a disruptive effect on a business environment that evaluates data for structural patterns of dynamic nonlinearity through a method of derivation such as a wavelet and phase space pattern reconstruction by the use of a computing machine.

It is another object of the present invention is to provide a dynamic nonlinear business modeling method for automatically predicting innovations that have a disruptive effect on a business environment that adapts and interprets the analysis to correlate with a general business model through an optimization method by the use of a computing machine.

It is another object of the present invention is to provide a dynamic nonlinear business modeling method for automatically predicting innovations that have a disruptive effect on a business environment that adapts and interprets the analysis to correlate with a general business model through an optimization method such as an artificial neural network (ANN) by the use of a computing machine.

It is another object of the present invention is to provide a dynamic nonlinear business modeling method for automatically predicting innovations that have a disruptive effect on a business environment that adapts and interprets the analysis to correlate with a general business model through an optimization method such as a feedback loop by the use of a computing machine.

It is another object of the present invention is to provide a dynamic nonlinear business modeling method for automatically predicting innovations that have a disruptive effect on a business environment that adapts and interprets the analysis to correlate with a general business model through an optimization method such as an ANN and/or feedback loop by the use of a computing machine.

It is another object of the present invention is to provide a dynamic nonlinear business modeling method for automatically predicting innovations that have a disruptive effect on a business environment that produces analysis output by the use of a computing machine.

It is another object of the present invention is to provide a dynamic nonlinear business modeling method for automatically predicting innovations that have a disruptive effect on a business environment that produces analysis output that requires no theoretical mathematical knowledge to interpret and/or understand by the use of a computing machine.

It is another object of the present invention is to provide a dynamic nonlinear business modeling method for automatically predicting innovations that have a disruptive effect on a business environment that produces graphical analysis output by the use of a computing machine.

It is another object of the present invention is to provide a dynamic nonlinear business modeling method for automatically predicting innovations that have a disruptive effect on a business environment that produces non-graphical analysis output by the use of a computing machine.

It is another object of the present invention is to provide a dynamic nonlinear business modeling method for automatically predicting innovations that have a disruptive effect on a business environment that produces graphical and non-graphical analysis output by the use of a computing machine.

It is another object of the present invention is to provide a dynamic nonlinear business modeling method for automatically predicting innovations that have a disruptive effect on a business environment that produces graphical and non-graphical analysis output that requires no theoretical mathematical knowledge to interpret and/or understand by the use of a computing machine.

It is another object of the present invention is to provide a dynamic nonlinear business modeling method for automatically predicting innovations that have a disruptive effect on a business environment that creates a business innovation scenario for users to compare when considering new business innovation strategy by the use of a computing machine.

It is another object of the present invention is to provide a dynamic nonlinear business modeling method for predicting innovations that have a disruptive effect on a business environment that produces graphical and non-graphical report portfolio formatted output.

It is another object of the present invention is to provide a dynamic nonlinear business modeling method for automatically predicting innovations that have a disruptive effect on a business environment that produces graphical and non-graphical report portfolio formatted output by the use of a computing machine.

It is another object of the present invention is to provide a dynamic nonlinear business modeling method for predicting innovations that have a disruptive effect on a business environment by automatically comparing standard historical data and data that is forecast for a newly introduced business innovation by the use of a computing machine.

It is another object of the present invention is to provide a dynamic nonlinear business modeling method for predicting innovations that have a disruptive effect on a business environment (represented by an expected performance gap) by automatically comparing standard historical data and data that is forecast for an newly introduced business innovation by the use of a computing machine.

It is another object of the present invention is to provide a dynamic nonlinear business modeling method for predicting innovations that have a disruptive effect on a business environment that allows for multiple scenarios for automatic side-by-side comparison of disruptive innovation options to consider acting upon by the use of a computing machine.

It is another object of the present invention is to provide a dynamic nonlinear business modeling method for predicting innovations that have a disruptive effect on a business environment that automatically performs a method for data smoothing processes as necessary by the use of a computing machine.

It is another object of the present invention is to provide a dynamic nonlinear business modeling method for predicting innovations that have a disruptive effect on a business environment that automatically performs a method for data smoothing processes as necessary such as polynomial smoothing by the use of a computing machine.

It is another object of the present invention is to provide a dynamic nonlinear business modeling method for predicting innovations that have a disruptive effect on a business environment that automatically performs a method for data smoothing processes as necessary such as moving average smoothing by the use of a computing machine.

It is another object of the present invention is to provide a dynamic nonlinear business modeling method for predicting innovations that have a disruptive effect on a business environment that automatically performs a method for data smoothing processes as necessary such as moving average smoothing and/or polynomial smoothing by the use of a computing machine.

These together with other objects of the invention, along with various features of novelty which characterize the invention, are pointed out with particularity in the claims and Detailed Description of the Embodiments Sections, and drawings of this application, with all said sections also adding to this disclosure.

DETAILED DESCRIPTION OF THE DISCLOSED EMBODIMENTS

The detailed description set forth below in connection with the appended drawings is intended as a description of presently preferred embodiments of the invention and does not represent the only forms in which the present invention may be constructed and/or utilized. The description sets forth the functions and the sequence of steps for carrying out the method disclosed as the invention with the illustrated embodiments. However, it is to be understood that the same or equivalent functions and sequences may be accomplished by different embodiments of the instant invention and these same or equivalent functions and sequences are also intended to be encompassed within the spirit and scope of the invention.

Previous methods used to predict economic and business patterns all ignore attempts to predict "disruptive business innovations", that is to say innovations introduced to the business environment that cause a fundamental shift in the market (or markets) they belong to. By ignoring this important phenomenon, business leaders are lacking a full set of information procurement tools, leaving them to make business decisions without all the pertinent information.

The present invention provides a solution to this information gap in economic and business pattern predictors by introducing a method that is designed to detect the presence of potentially disruptive business innovations. This invention thereby provides business leaders with an important tool allowing them to make better informed business decisions that ultimately will lead to better business and economic performance.

Figure 1:
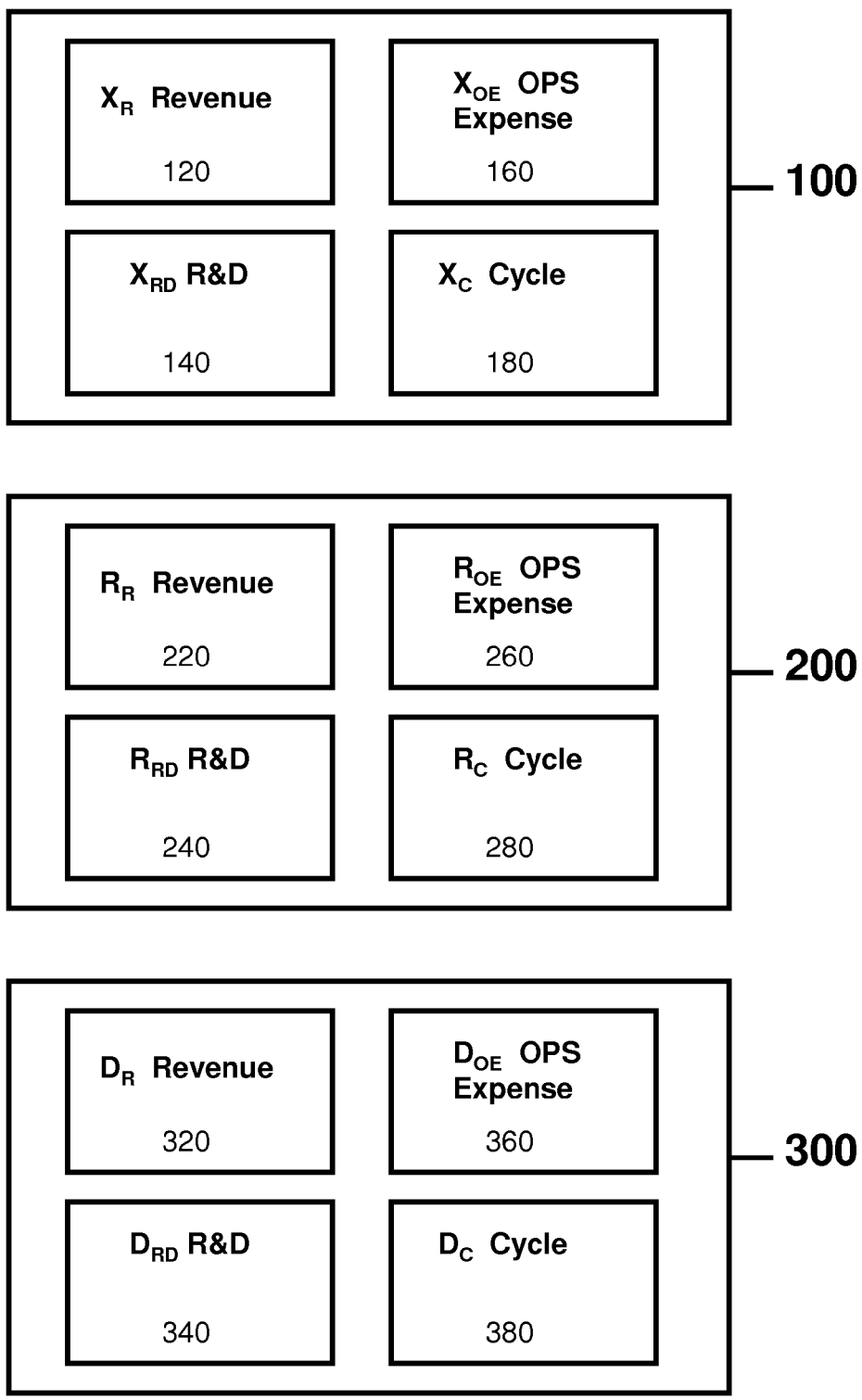
FIG. 1 illustrates sets of data used by this method and the basic data elements comprising said sets.

FIG. 1 illustrates various sets comprising the three types of time series innovation data (data that comprises business performance metrics) used by the instant invention. It should be noted that all time series innovation data should comprise at least 100 points over a given time period (that is $X=(x_1, x_2, \ldots x_n)$, where $n \geq 100$). In this way time series data defining $X_R$ as $X_R=(x_{R1}, x_{R2}, \ldots x_{Rn})$ and represents forecast revenue performance from the business innovation, $X_R$, weekly over the next two years for example. Similarly, time series data defining $R_R$ as $R_R=(r_{R1}, r_{R2}, r_{Rn})$ represents referenced data from recorded industry revenue performance data for each week during the past two years for example. Specifically, FIG. 1 illustrates a set of expected time series innovation data types 100 and a set of referenced time series innovation data types 200. Further, the set of expected time series innovation data types and the set of referenced time series innovation data types 200 comprise their own data members, wherein said sets 100, 200 further comprise their own respective expected time series innovation revenue and referenced time series innovation revenue data members 120, 220, expected time series innovation research and development and referenced time series innovation research and development data members 140, 240, expected time series innovation OPS (operations) expense and referenced time series innovation OPS expense data members 160, 260 and expected time series innovation time cycle and referenced time series innovation time cycle data members 180, 280. From the sets of expected and referenced time series innovation data types 100, 200 the set of difference time series innovation data types 300 is derived, wherein said set of difference time series innovation data types comprise a revenue difference time series innovation data member 320, a difference time series innovation research and development data member 340, a difference time series innovation OPS expense data member 360 and a difference time series innovation time cycle data member 380. Further, the revenue difference time series innovation data member 320, the research and development difference time series innovation data member 340, the OPS expense difference time series innovation data member 360 and the time cycle difference time series innovation data member 380 are all derived by taking the mathematical difference from their respective expected time series innovation revenue and referenced time series innovation revenue data members 120, 220, expected time series innovation research and development and referenced time series innovation research and development data members 140, 240, expected time series innovation OPS expense and referenced time series innovation OPS expense data members 160, 260 and expected time series innovation time cycle and referenced time series innovation time cycle data members 180, 280. Additionally, it should be noted that as the instant invention utilizes at least one dynamic nonlinear mathematical technique, the range required for the time series data points typically is between $10^{Dim/2}$ and $10^{Dim}$, where Dim is the embedded dimension calculated for the difference time series under analysis. One embodiment of the instant invention uses a time series length of 100 data points as the significance threshold in creating any new time series.

Figure 1A:
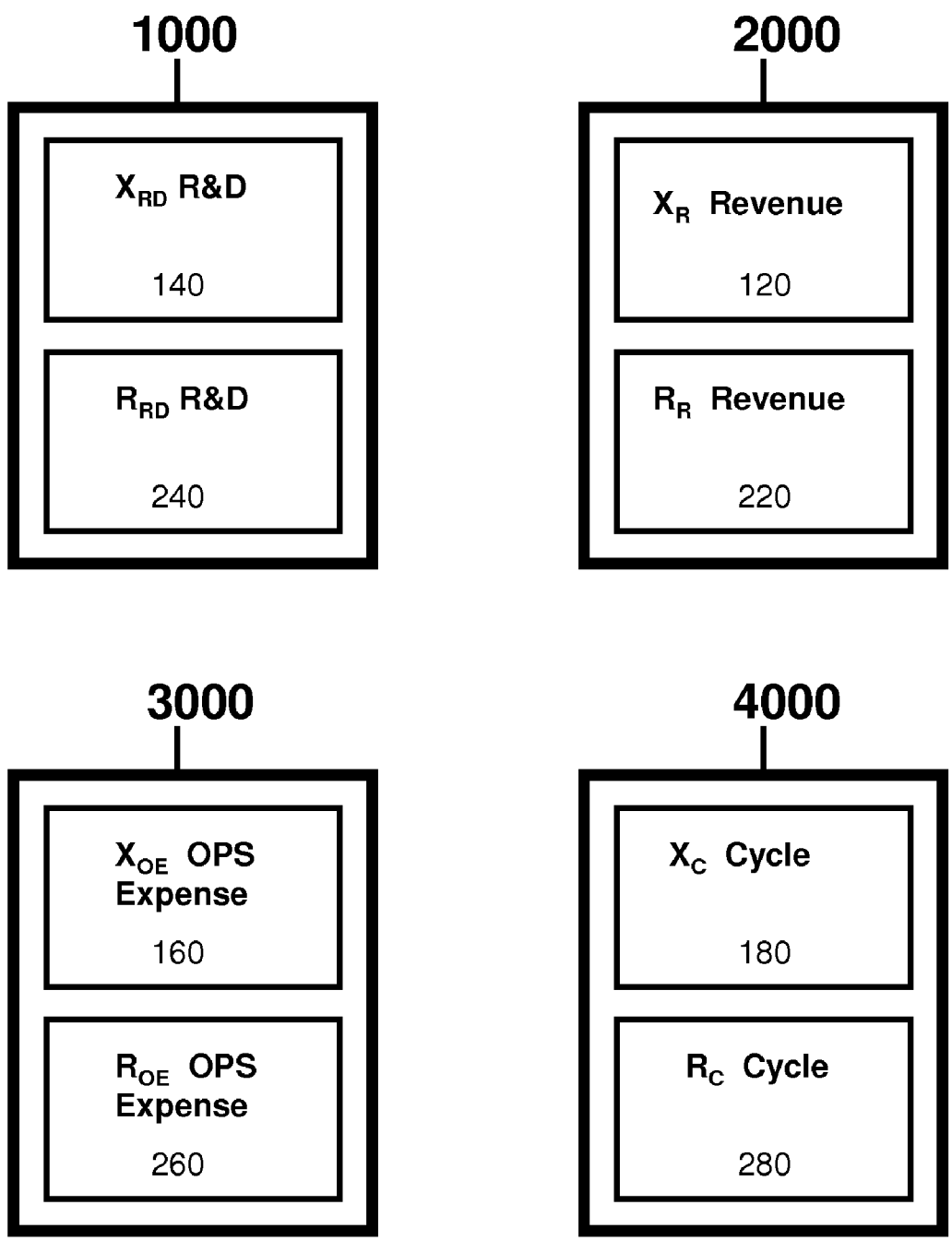
FIG. 1A illustrates several pared data sets used by the instant method.

FIG. 1A illustrates data sets used by the instant invention throughout execution of its method, wherein said data sets are arranged by their expected and referenced time series innovation data members. By such arrangement a research and development data set 1000, a revenue data set 2000, an OPS expense data set 3000 and a time cycle data set 4000 are created. This in turn dictates that the research and development data set 1000 comprises the expected time series innovation research and development data member 140 and the referenced time series innovation research and development data member 240. Similarly, the revenue data set 2000 comprises an expected time series innovation revenue data member 120 and a referenced time series innovation revenue data member 220, the OPS expense data set 3000 comprises an expected time series innovation OPS expense data member 160 and a referenced time series innovation OPS expense data member 260 and the time cycle data set 4000 comprises an expected time series innovation time cycle data member 180 and a referenced time series innovation time cycle data member 280.

Figure 1B:
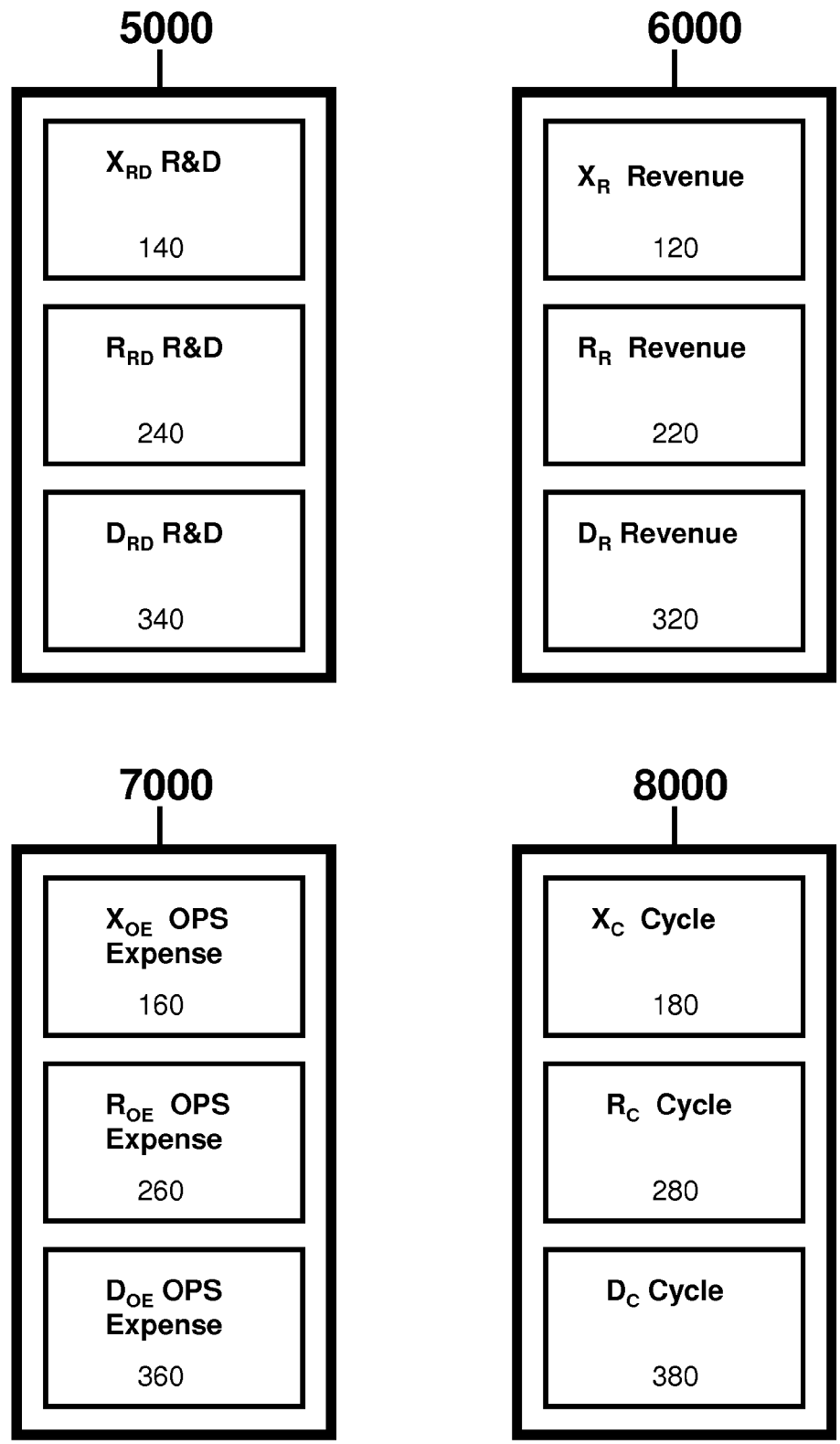
FIG. 1B illustrates various sets of data used by the instant method.

FIG. 1B illustrates data sets used by the instant invention throughout execution of its method, wherein said data sets are arranged by their expected and referenced data members as in FIG. 1A, however with each data set adding their own respective difference data member. By such arrangement an extended research and development data set 5000, an extended revenue data set 6000, an extended OPS expense data set 7000 and an extended time cycle data set 8000 are created. Similarly to the arrangement in FIG. 1A, the arrangement used in FIG. 1B in turn dictates that the extended research and development data set 5000 comprises an expected time series innovation research and development data member 140, a referenced time series innovation research and development data member 240 and a difference time series innovation research and development data member 340. Similarly, the extended revenue data set 6000 comprises an expected time series innovation revenue data member 120, a referenced time series innovation revenue data member 220 and a difference time series innovation revenue data member 320, the extended OPS expense data set 7000 comprises an expected time series innovation OPS expense data member 160, a referenced time series innovation OPS expense data member 260 and a difference time series innovation expense data member 360 and the extended time cycle data set 8000 comprises an expected time series innovation time cycle data member 180, a referenced time series innovation time cycle data member 280 and a difference time series innovation time cycle data member 380.

Figure 2:
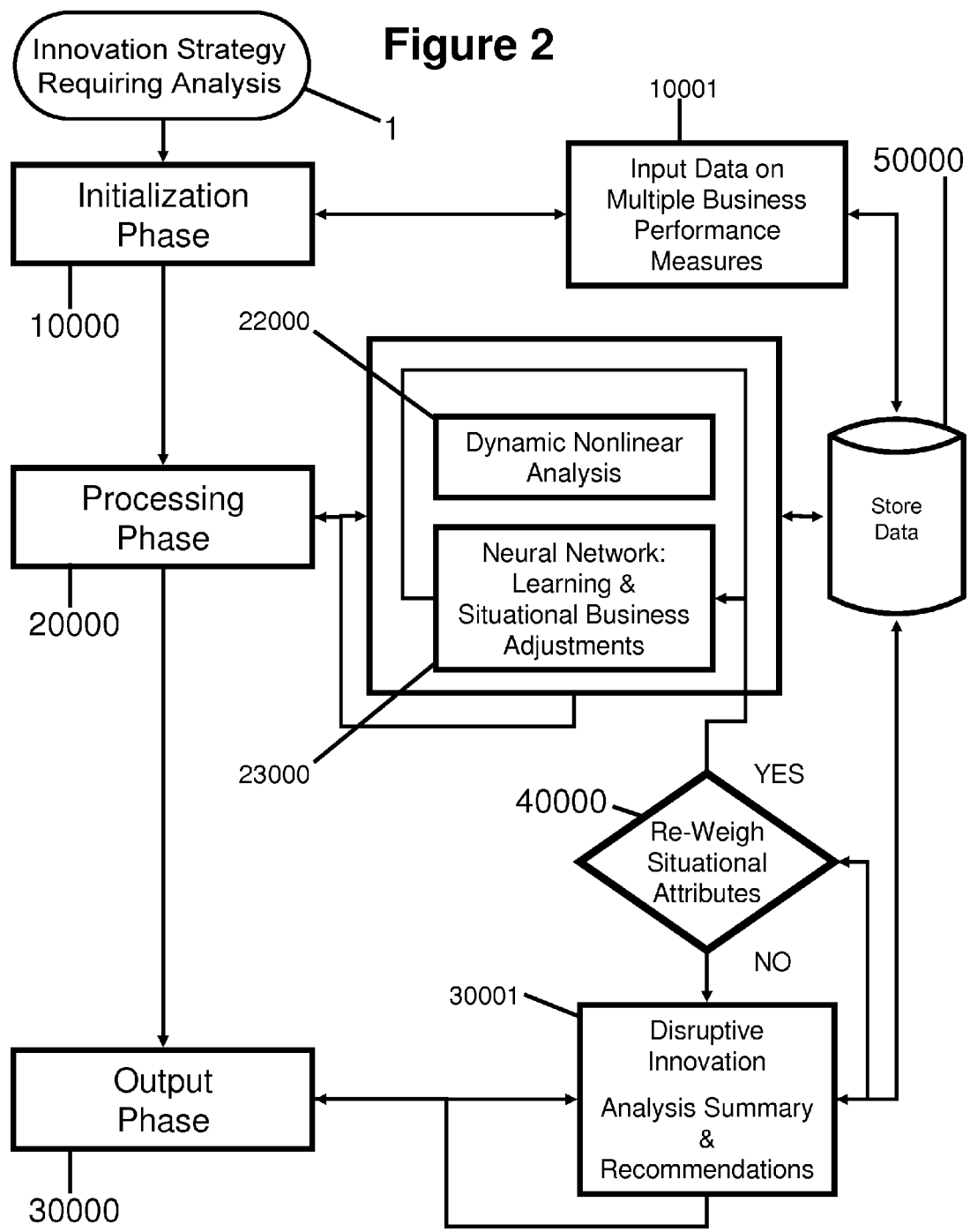
FIG. 2 illustrates an overview of the entire method while depicting the highest level of method abstraction and the relation of that level to some method steps at lower levels of abstraction.
Figure 19:
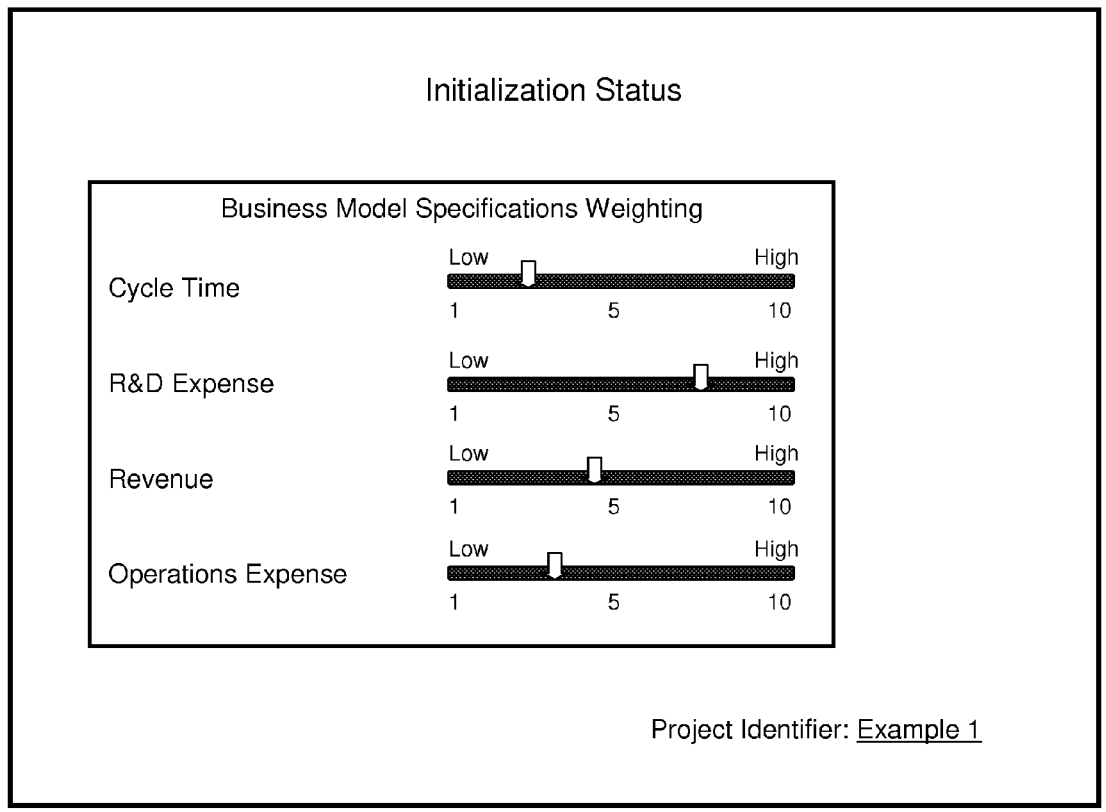
FIG. 19 illustrates one method of user assigning weights to the value of data types used by the instant invention when the instant invention is performed through the aid of a computing machine.

FIG. 2 illustrates an overview of the instant invention and the steps comprising its method at the highest level of abstraction and how those steps relate to other steps that are found at lower levels of abstraction. Initially, a user identifies a candidate innovation strategy that requires analysis 1 to determine if it has the potential to have disruptive effects on the market the innovation is involved in. After identifying a candidate innovation strategy for analysis 1 the user begins the initialization phase 10000 of the instant invention involving the input of data relating to Multiple Business Performance Measures 10001 and situational attribute settings (as illustrated in FIG. 19) that may be stored in at least one computing machine 50000. After the initialization phase 10000 the data entered during said initialization phase 10000 is processed by a series of steps during the methods processing phase 20000, comprising steps to perform a Dynamic Nonlinear Analysis 22000 and steps that allow for Neural Network Learning and Situational Business Adjustments 23000. The data obtained by performing calculations during the processing phase 20000 may be continuously stored in one or more computing machines 50000. Upon completion of a round of processing within the processing phase 22000 the Output phase 30000 begins to perform its set of operations, wherein an analysis summary, conclusions of the disruptive nature (or lack there of) of an innovation and recommendations based on those conclusions are presented to the user 30001 and may be stored on at least one computing machine 50000.

Figure 3:
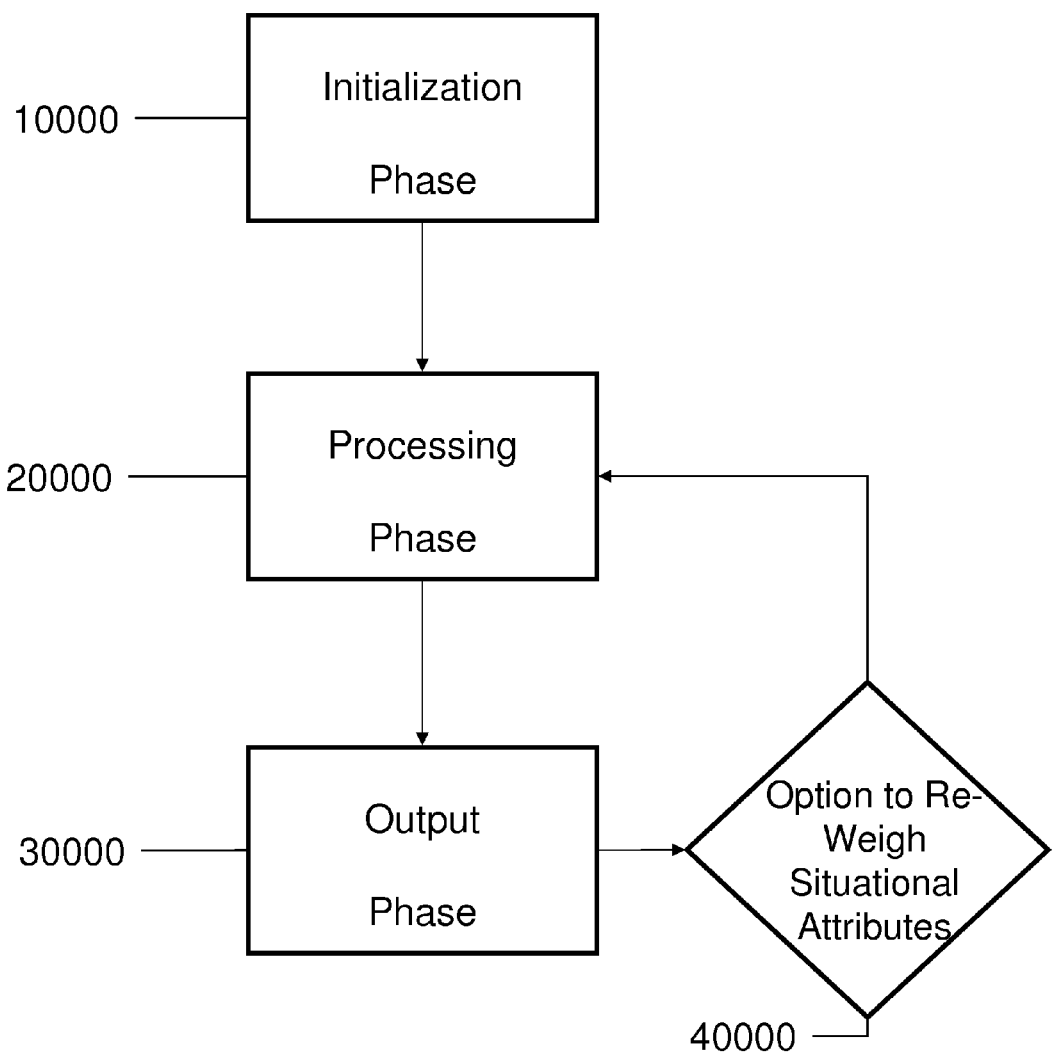
FIG. 3 illustrates the highest level of abstraction regarding the execution of steps performed by the instant method.
Figure 4:
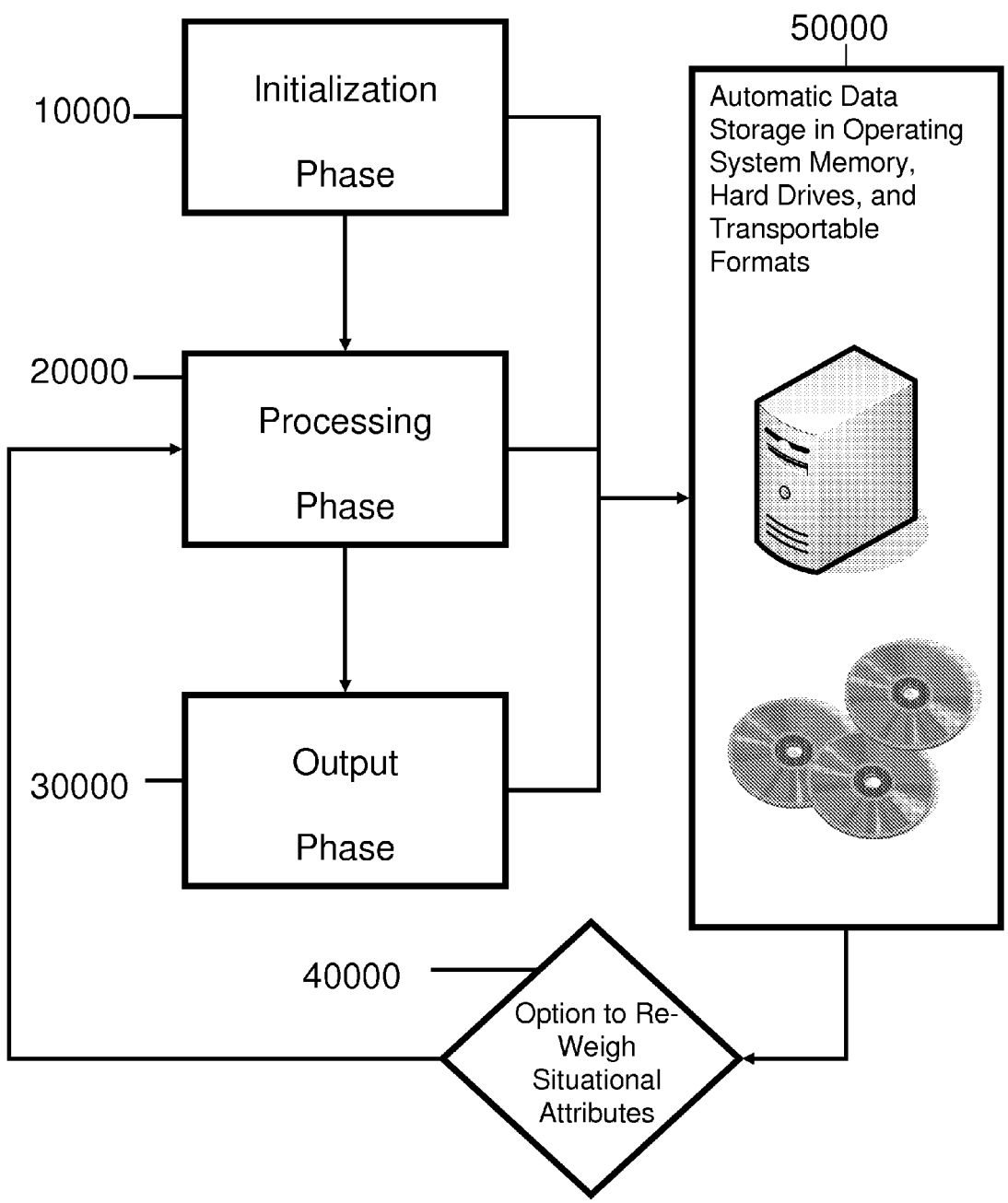
FIG. 4 illustrates the highest level of abstraction for an alternate embodiment of the instant invention, wherein in this embodiment the method is facilitated by the use of at least one computing machine.

FIGS. 3 and 4 illustrate separate embodiments of the instant invention at the highest possible level of abstraction for the method put forth in the instant invention. FIG. 3 illustrates the highest level of method abstraction for an embodiment of the instant invention, wherein the steps involved may be performed by any means available to a user to perform the necessary steps to carry out the instant method. Thus FIG. 3 comprises the initialization 10000 the processing 20000, and output 30000 phases as well as the option to reweigh situational attributes 40000 as illustrated in FIG. 2. FIG. 4 also illustrates the initialization 10000 processing 20000, and output 30000 phases and the option to reweigh situational attributes 40000 as shown in FIGS. 2 and 3, however FIG. 4 further illustrates that these steps are all performed with the aid of at least one computing machine 50000 (not illustrated in FIG. 3).

Figure 5:
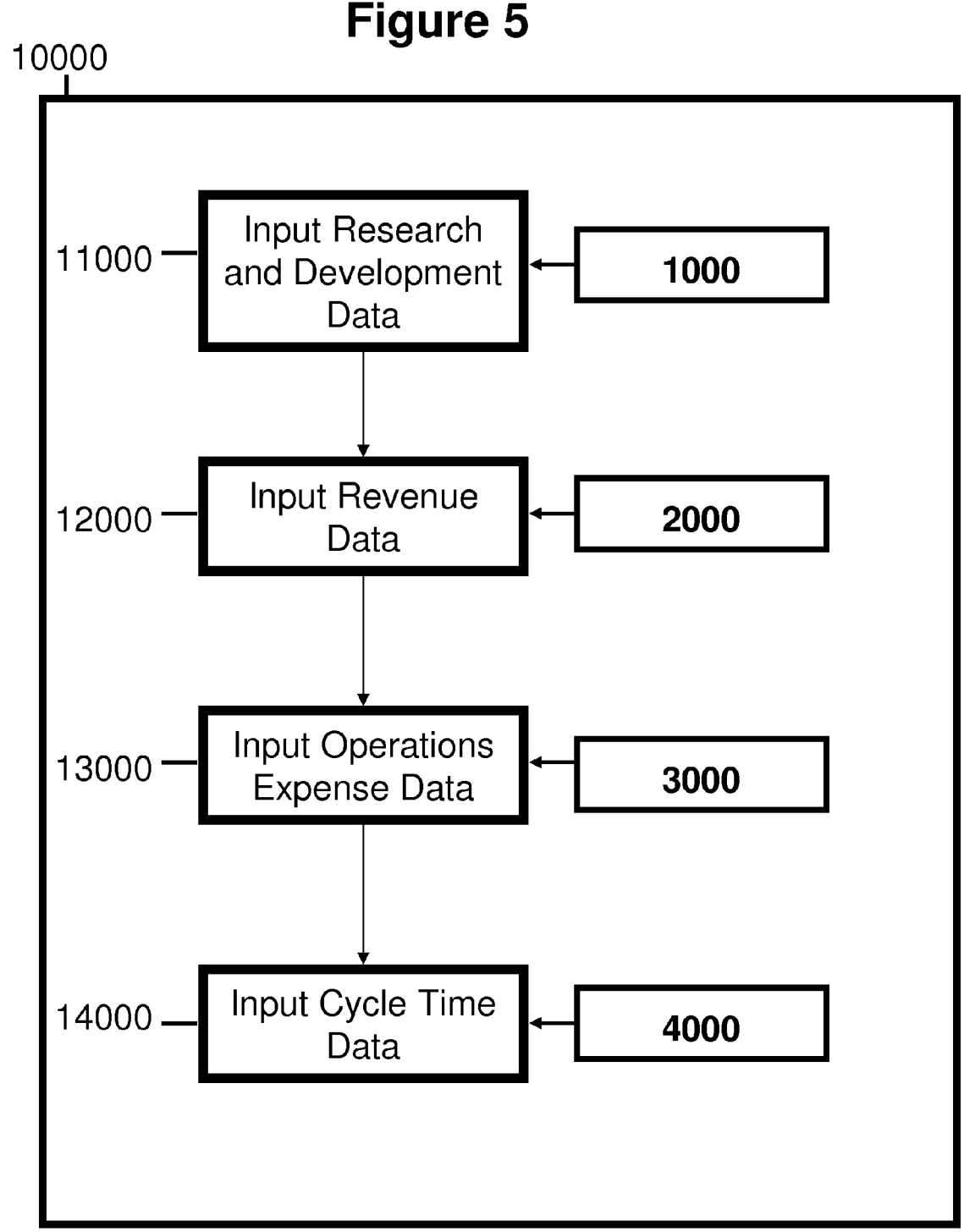
FIG. 5 illustrates the steps involved to perform the initialization phase step illustrated in FIGS. 2 and 3.

FIG. 5 illustrates the initialization phase 10000 and the steps that comprise the processing phase at a lower level of abstraction. Specifically FIG. 5 illustrates a step where the research and development data set 1000 is entered and/or used as input 11000 for the method to later calculate during the processing phase 20000. Similarly, the revenue data set 2000, Ops (operations) expense data set 3000 and the cycle time data set 4000 are also entered and/or used as input 12000, 13000, 14000 for later calculations during the processing phase 20000. Note that a user, when implementing the instant invention with the use of a computing machine, may enter time series innovation data personally or imports these data from files storing the data (a spreadsheet file for example). Also, the user enters a set of time series data for the same metric, but from a competitive reference such as the industry standard over a recent similar amount of time.

Figure 6:
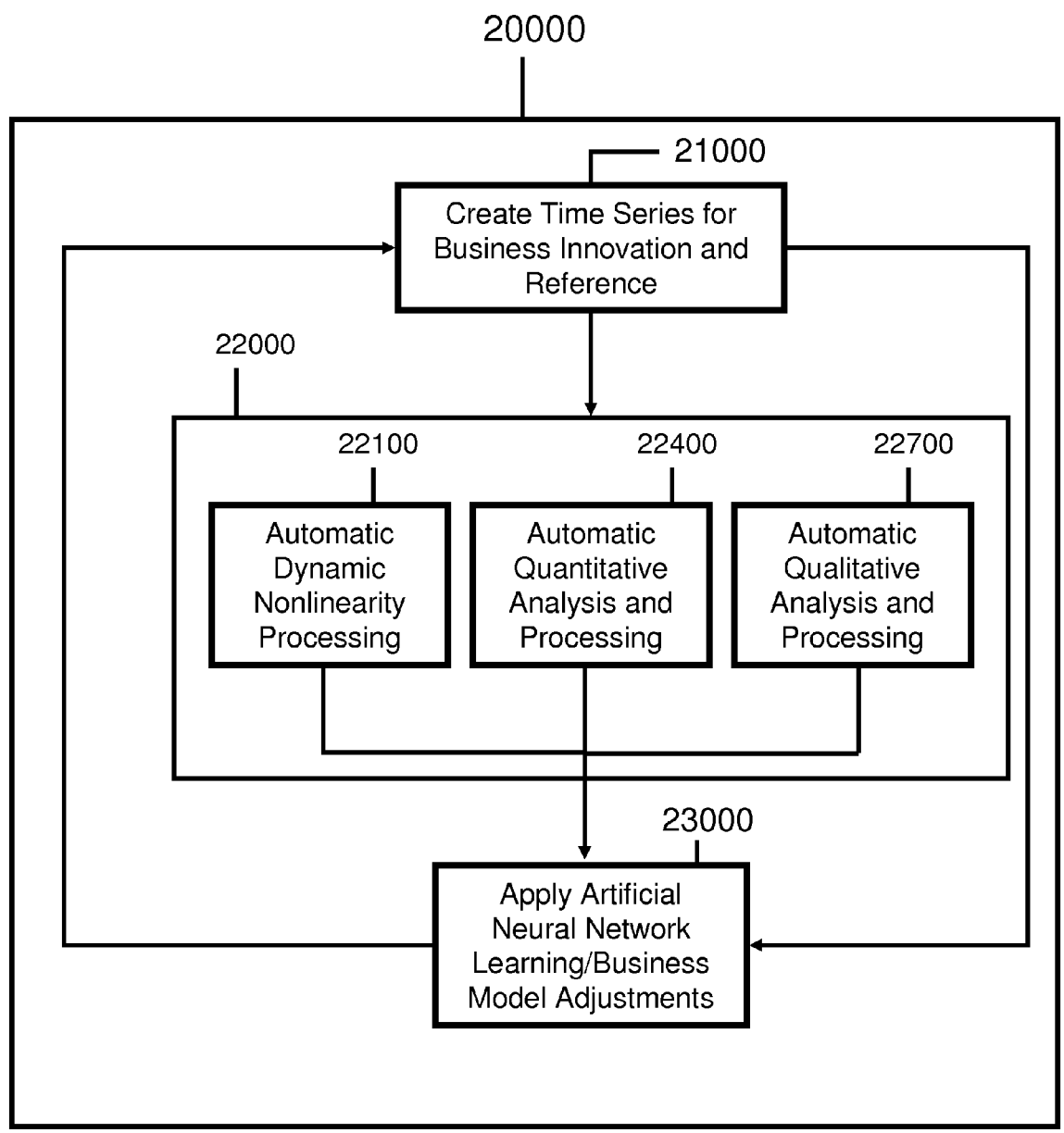
FIG. 6 illustrates the steps involved in execution of the processing phase of the instant invention as shown in FIG. 2.

FIG. 6 illustrates the processing phase 20000 and steps comprising the processing phase 20000 at lower levels of abstraction. At one lower level of abstraction the processing phase 20000 comprises substantially concurrently (dynamically) performed steps of creating a time series for a business innovation and creating a time series for referenced data relating to previous business innovations 21000, performing nonlinear quantitative and qualitative analysis and processing 22000 and the step of using a learning means, such as an artificial neural network, to further process the information 23000 from the time series information step 21000 with the results from the analysis and processing step 22000. Data in the form of a time series for this invention is a set of business measure values taken at regular intervals in succession, such as, for example, weekly revenue totals taken at the end of each week for one hundred weeks. Note that the information produced from the step of creating a time series 21000 is fed to both the step of performing nonlinear quantitative and qualitative analysis and processing 22000 and the step of using a learning means 23000 for their processing by those respective steps, while the results of the step of using a learning means 23000 is only reapplied to the step of creating a time series. In this way all steps 21000, 22000, 23000 comprising the processing phase 20000 feed their respective results from their processing and analysis back to one anther (directly or indirectly), thus creating a dynamic process and analysis relationship within the processing phase 20000. Further illustrated in FIG. 6 are a set of substantially concurrently performed steps comprising the step of performing nonlinear quantitative and qualitative analysis and processing 22000 at a lower level of abstraction. Specifically the step of performing nonlinear quantitative analysis and processing 22000 comprises the steps of performing dynamic nonlinearity processing 22100, quantitative dynamic nonlinear processing 22400 and qualitative dynamic nonlinear processing 22700.

Figure 7:
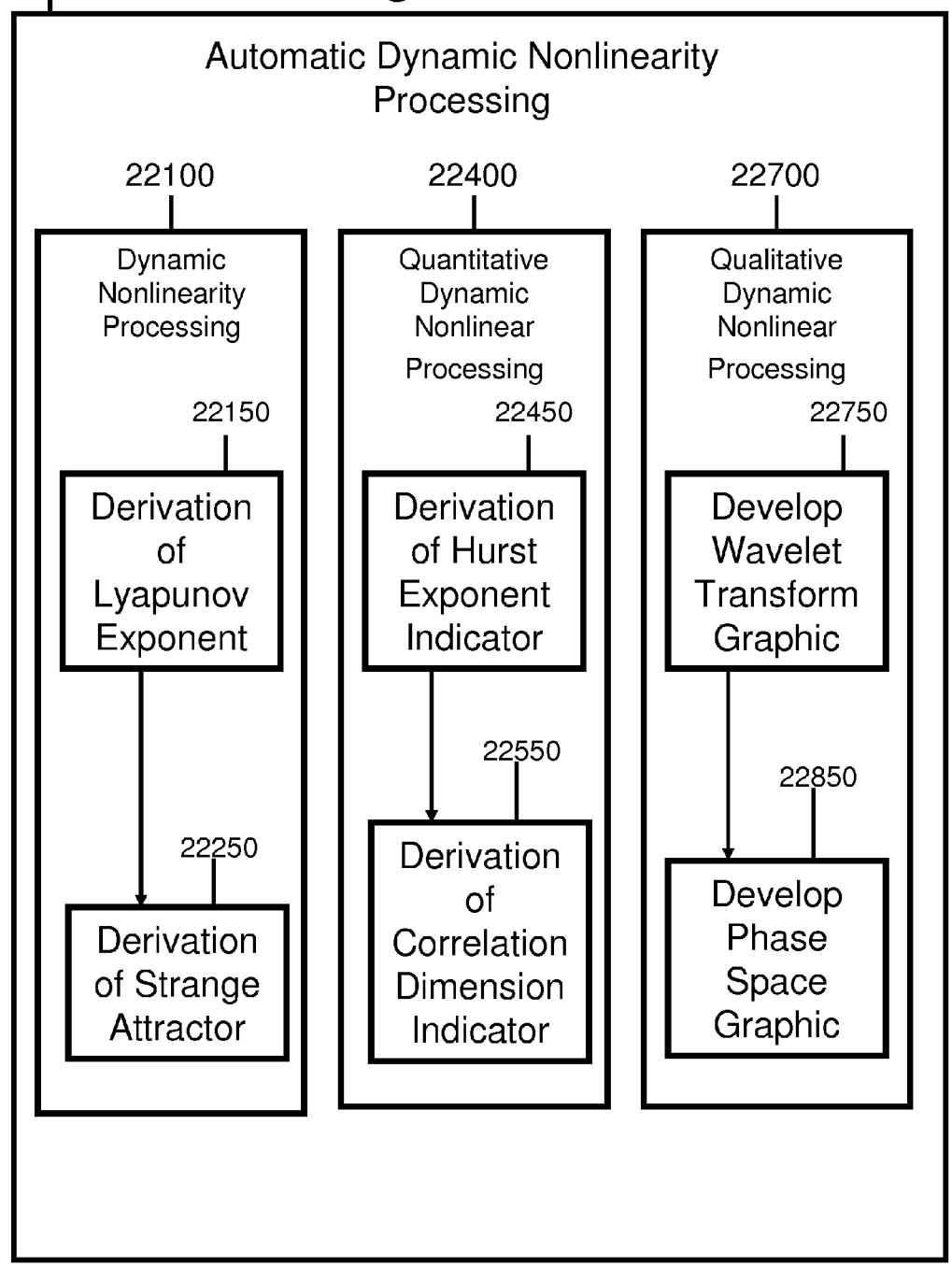
FIG. 7 illustrates the steps involved in the processing and analysis steps illustrated in FIG. 6 at a lower level of abstraction of the method.

FIG. 7 illustrates the automatic dynamic nonlinearity processing step 22000 of FIG. 6 at lower levels of abstraction, wherein said automatic dynamic nonlinearity processing step 22000 comprises the three substantially parallel steps of dynamic nonlinear processing 22100, quantitative dynamic nonlinear processing 22400 and qualitative dynamic nonlinear processing 22700. As shown in FIG. 7, the dynamic nonlinear processing step 22100 comprises the steps of the derivation of Lyapunov exponents 22150 and the derivation of Strange Attractors 22250 (see FIGS. 11 and 13). Also as shown in FIG. 7 is that the quantitative dynamic nonlinear processing step 22400 comprises the steps of the derivation of Hurst exponents 22450 and the derivation of Correlation Dimension indicators 22550 (see FIGS. 14 and 15). In addition FIG. 7 illustrates that the qualitative dynamic nonlinear processing step 22700 comprises the steps of developing a wavelet transform graphic 22750 and developing a phase space graphic 22850.

Figure 8:
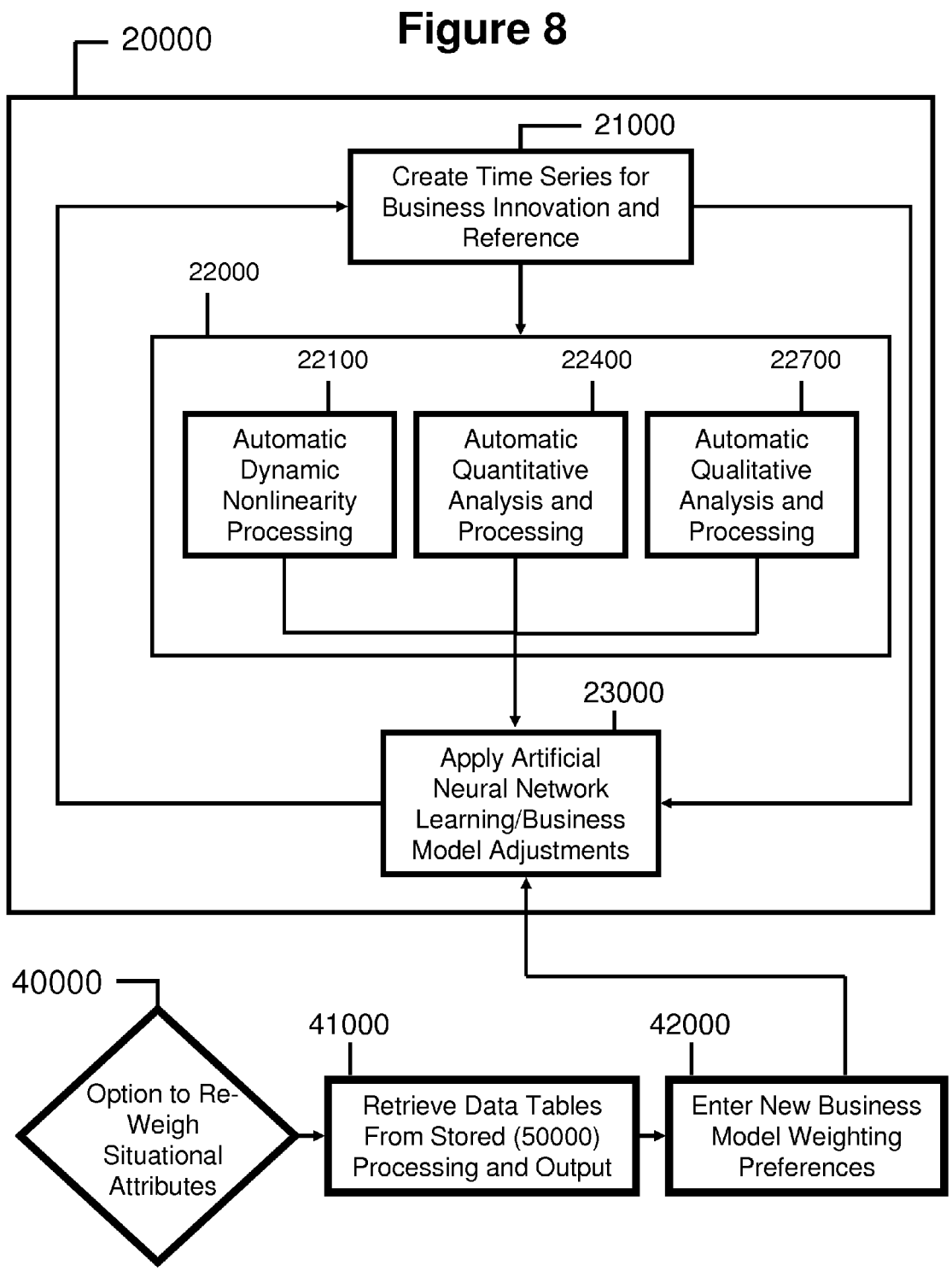
FIG. 8 illustrates the steps involved in execution of the processing phase of the instant invention as shown in FIG. 3, including a step for the user to opt to reweigh attributes and perform the method again with the reweighed attributes.

FIG. 8 illustrates the processing phase 20000 as shown in FIG. 6 when the step to introduce newly reweighed situational attributes 40000 is exercised. In those instances when the step to introduce newly reweighed situational attributes 40000 is exercised, first the step of retrieving all required stored and/or non-stored data (such as neural network nodes and weights, processing values from previous iterations, etc.) for processing 41000, wherein said all stored data was stored in the step of saving information on at least one computing machine 50000. After the step of retrieving all necessary data for processing 41000 the step of entering in new business model weight preferences 42000 is performed and then all data retrieved from the step of retrieving all necessary data for processing 41000 and the new business model weight preferences are reintroduced for processing by the step of using a learning means to further process information 23000 of the processing phase. In this way the processing phase receives its new set of parameters to process for potentially different results.

Figure 9:
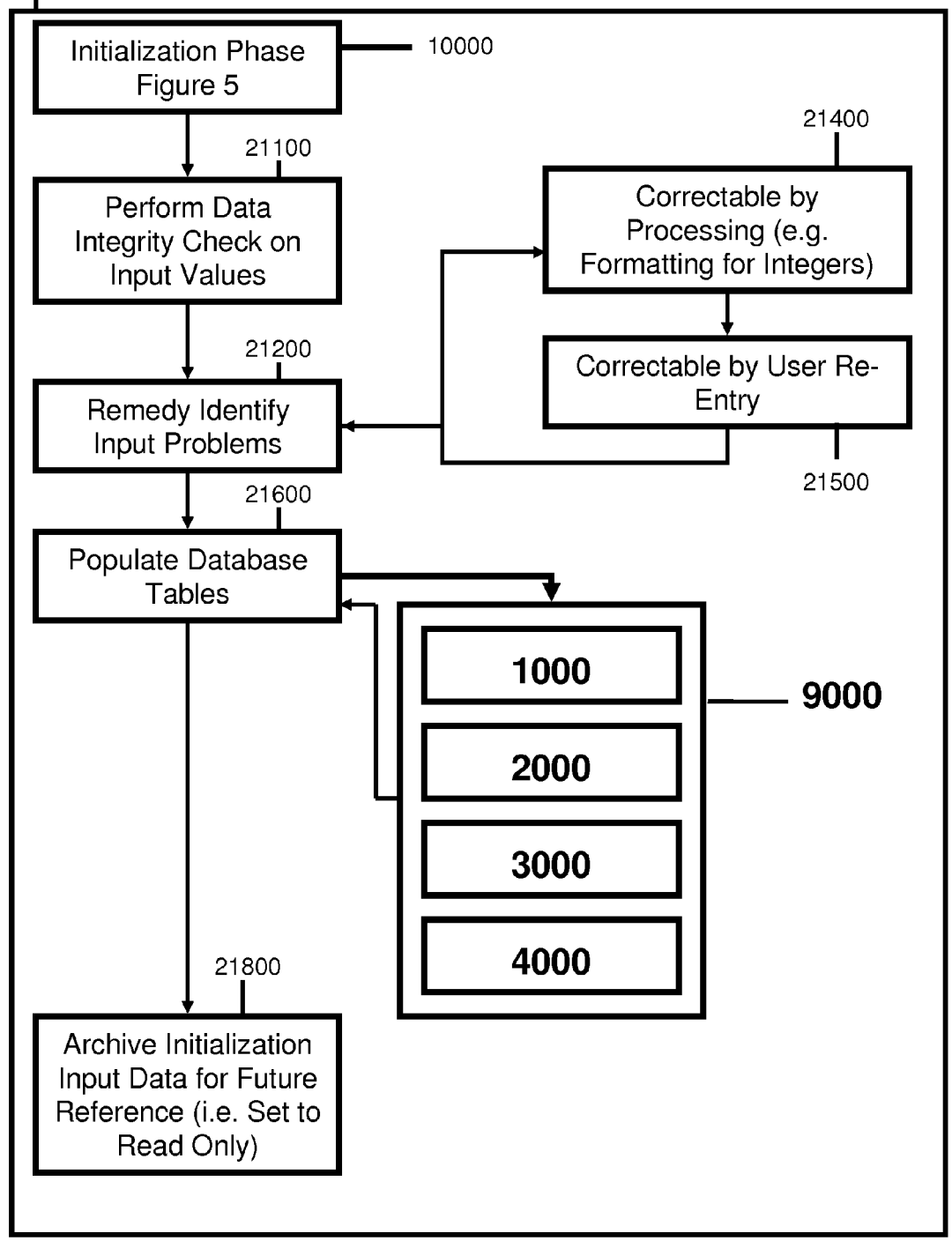
FIG. 9 illustrates the steps used by the instant invention to create a time series for business innovations and references as shown in FIGS. 5 and 8.

FIG. 9 illustrates the step of creating a time series for a business innovation and for creating a time series for referenced data relating to previous business innovations 21000 (see FIGS. 6 and 8) and the steps that comprise this step at a lower level of abstraction. The initial step to creating these times series involves performing a data integrity check on previously entered input values 21100. This initial step is followed by steps to correct identified input problems 21200 (when necessary). A first step used to correct input values is by changing the form of the input into one that can be processed by whatever person or tool is facilitating the execution of the steps to correct identified input values 21200 (e.g. if a computing machine is being used then the input must be in a format that the computing machine may process) 21400. A second step used to correct input values is to simple allow the user to reenter the values when appropriate to do so 21500. Upon completion of remedying all improper input errors 21200 the step of filling a data repository (such as a at least one database in instances when the instant invention is being facilitated with the aid of at least one computing machine) is performed 21600, filling said data repository with current data for a research and development data set 1000, a revenue data set 2000, an OPS expense data set 3000 and a time cycle data set 4000. Finally the step of creating a time series for a business innovation and for creating a time series for referenced data relating to previous business innovations 21000 is completed by performing the step of archiving the initialization input data for future reference 21800.

Figure 10:
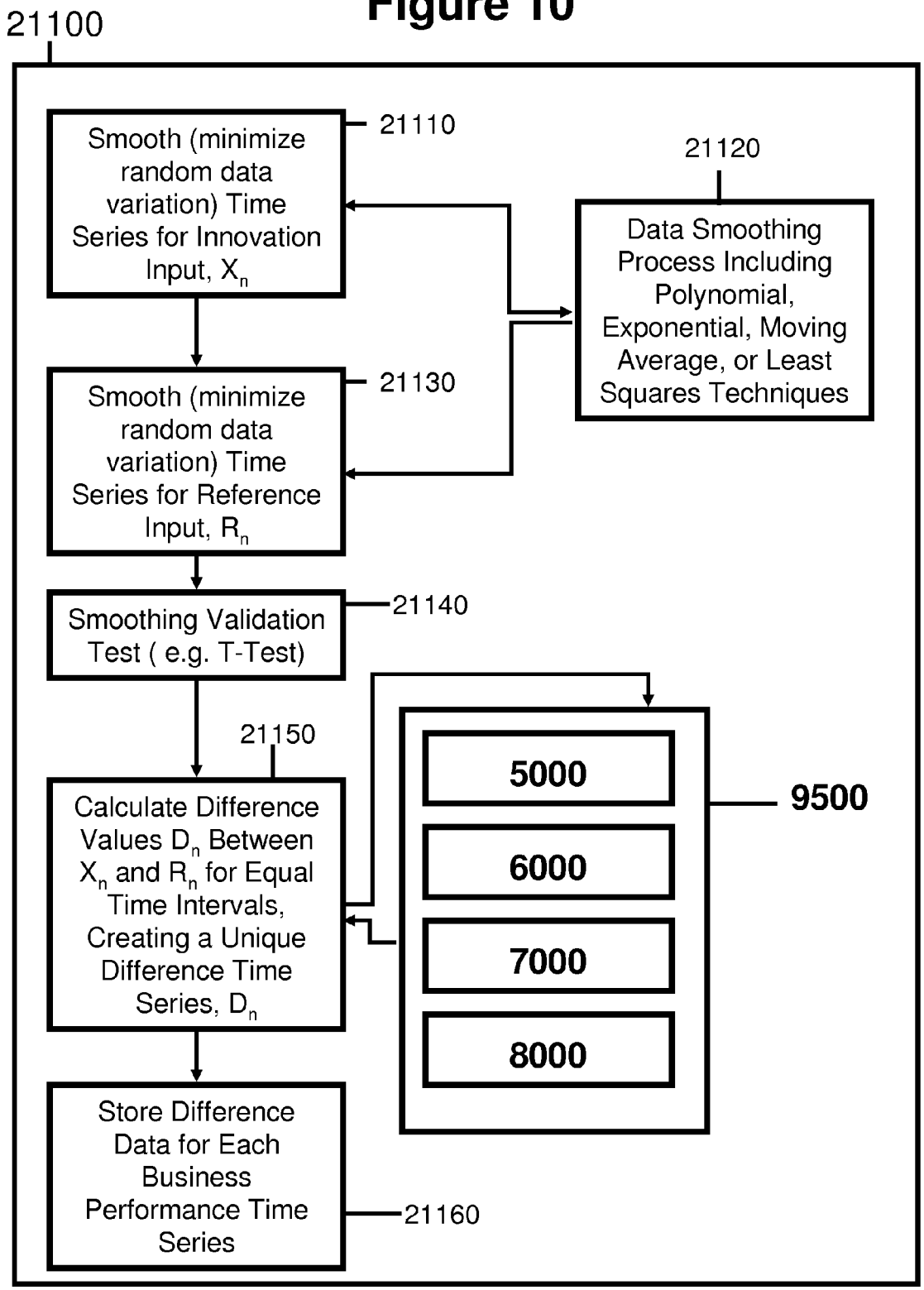
FIG. 10 illustrates the steps used to perform data integrity checks on input values as shown in FIG. 9.

FIG. 10 illustrates the step of performing a data integrity check on previously entered input values 21100 of FIG. 9 and the steps comprising this step at a lower level of abstraction. The first two steps in performing a data integrity check on previously entered input values 21100 is to "smooth" (randomize data variation) time series data for innovation input $X_n$ 21110 and time series data for reference input values $R_n$ 21130. These steps of smoothing time series data involve steps for performing Polynomial, Exponential, Moving Average and/or Least Squares techniques 21120 on the input data going though the integrity check. Upon the completion of the initial data smoothing steps 21110, 21130 a smoothing validation test (T-Test) 21140 is performed, followed by a step to create a unique difference time series $D_n$ 21150. The step of creating a unique difference time series $D_n$ (for their respective extended data sets) 21150 involves calculating the difference between time series data for innovation input $X_n$ and time series data for reference input values $R_n$ from their respective extended research and development, revenue, OPS expense and time cycle data sets 5000, 6000, 7000, 8000.

Finally, the difference time series $D_n$ for each business performance time series is stored for future reference 21160 (possibly on at least one computing machine).

Figure 11:
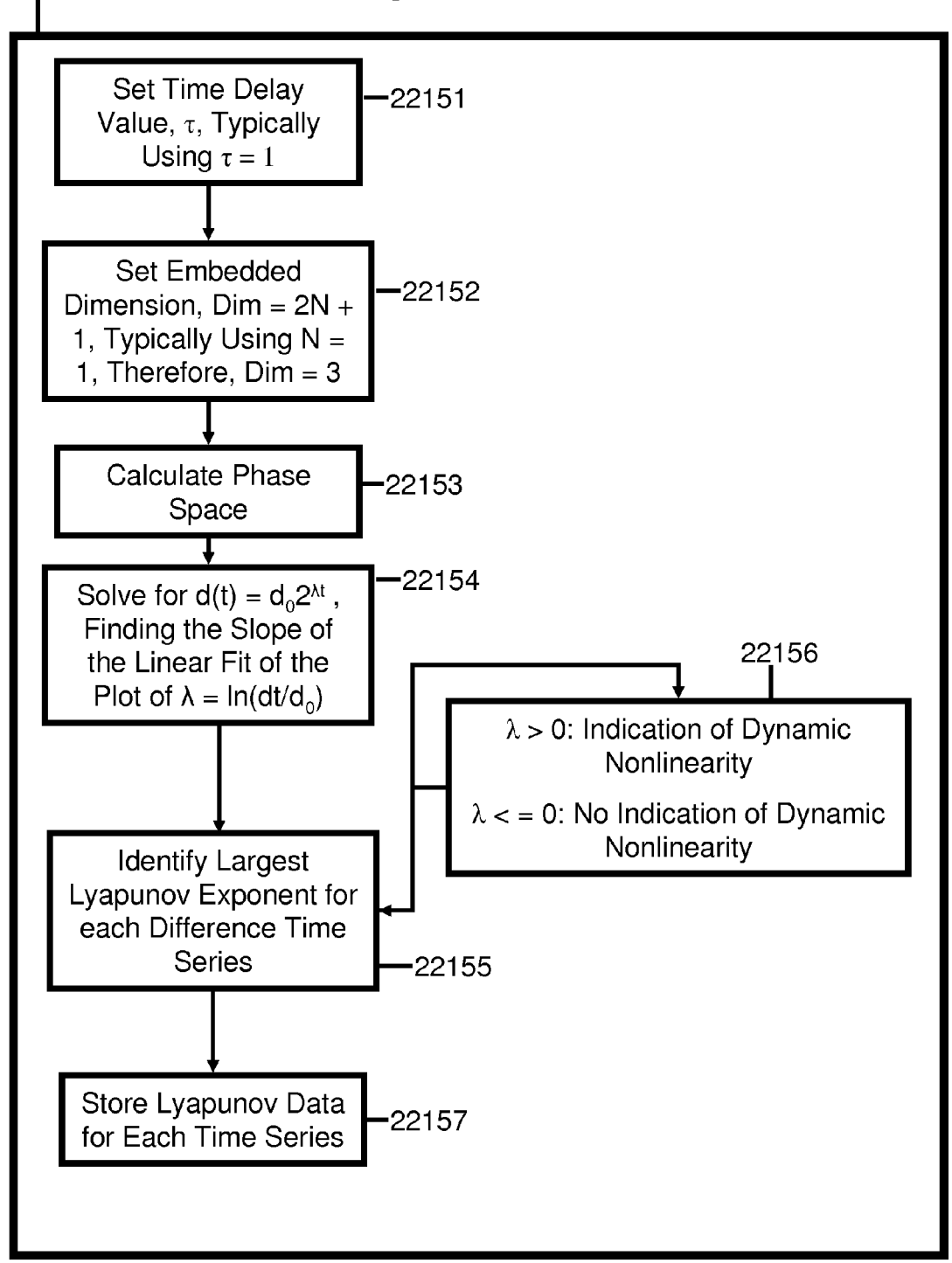
FIG. 11 illustrates the steps involved in determining the derivation of the Lyapunov Exponent as shown in FIG. 7.

FIG. 11 illustrates the step of deriving a Lyapunov exponent 22150 of FIG. 7 and the steps comprising this step at a lower level of abstraction. Generally, this step involves calculating a Lyapunov exponent by determining the applicable embedded dimension, Dim, and reconstructing the time series data into a workable phase space (this technique of analyzing time series data for structures of dynamic nonlinearity is known as phase space reconstruction). The essentially involves rebuilding and reconstructing the difference time series data to reveal the presence or lack of presence of dynamic nonlinearity. Note that the embedded dimension, Dim, is set as the bounds of the system when the difference time series data is plotted in phase space and it represents the number of dimensions applicable to the reconstructed time series data. Now, referring to back to FIG. 11, the process of determining the applicable embedded dimension, Dim, and phase space reconstruction begins by first to calculate a Lyapunov exponent 22150 by performing a step of setting a time delay value $\tau$ (with a typical value of $\tau=1$) 22152, followed by a step of setting the applicable embedded dimension Dim, to Dim=2N+1 (with a typical N value of N=1, thus Dim having a typical value of Dim=3) 22152. These two steps 22151, 22152 are followed by a step to calculate the Phase Space 22153 for the relevant time series data (see FIG. 12). The steps following the step of calculating the Phase Space involve carrying out a Lyapunov exponent test 22154, 22155, 22156, wherein said Lyapunov exponent test comprises defining the exponent as $d(t)=d_0 2^{\lambda t}$ (where $d(t)$ is the distance between two trajectories in the reconstructed time series at some point in time after the initial condition, $d_0$ is the distance between trajectories at the initial condition, $\lambda$ is the largest Lyapunov exponent, and t is the duration or time period of the time series) 22154. By this equation an average rate of divergence of the two consecutive phase space trajectories is found. Then by applying a linear fit technique to the slope of the plot of $\ln(dt/d_0)$ 22154 and then performing a step of identifying the largest Lyapunov exponent 22155 (sorting algorithms or the like may be used to identify said largest Lyapunov exponent). As the step to determine the largest Lyapunov exponent 22155 is carried out, a concurrent step of evaluating $\lambda$ (largest Lyapunov exponent) to see if it indicates the presence of dynamic nonlinearity 22156 is also performed. In evaluating $\lambda$ the method defines that a $\lambda$ greater then zero ($\lambda>0$) tends to indicate the presence of dynamic nonlinearity and that instances when a $\lambda$ less then or equal to zero ($\lambda<=0$) tends to indicate the lack of dynamic nonlinearity. Finally, this process is completed by storing Lyapunov data for each time series is stored for future use and reference 22157.

Figure 12:
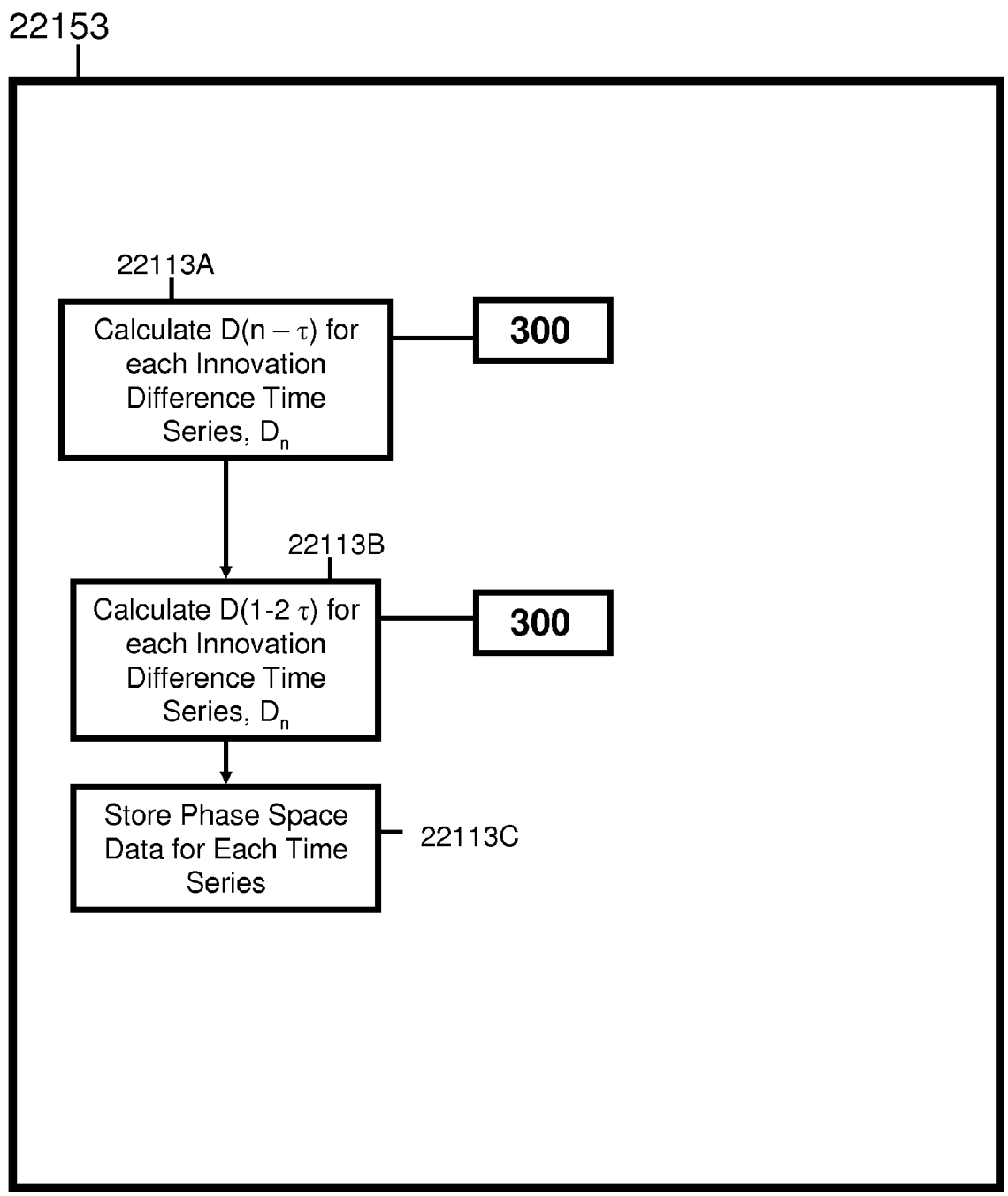
FIG. 12 illustrates the steps involved to calculate the phase space as shown in FIG. 11.

FIG. 12 illustrates the step of calculating the phase space 22153 of FIG. 11 and the steps comprising this step at a lower level of abstraction. The initial step of calculating the phase space 22153 is to perform a step to calculate the embedded dimension (Dim) such that $D(n-\tau)$ for each innovation difference time series $D_{n=}(d_1, d_2), (d_2, d_3), \ldots (d_n, d_{(n-\tau)})$ 22153A, wherein n is the number of time series values being evaluated and $\tau$ is the interval distance to the next time series value or time delay, by working with using the current set of difference time series innovation data types 300. The next step in calculating the phase space 22153B is to calculate $D(1-2\tau)$ for each innovation difference time series $D_n$ by again working with using the current set of difference time series innovation data types 300. Finally, the step of calculating the phase space 22153 for the instant invention is completed by performing the step of storing the calculated phase space data for each time series 22153C.

Figure 13:
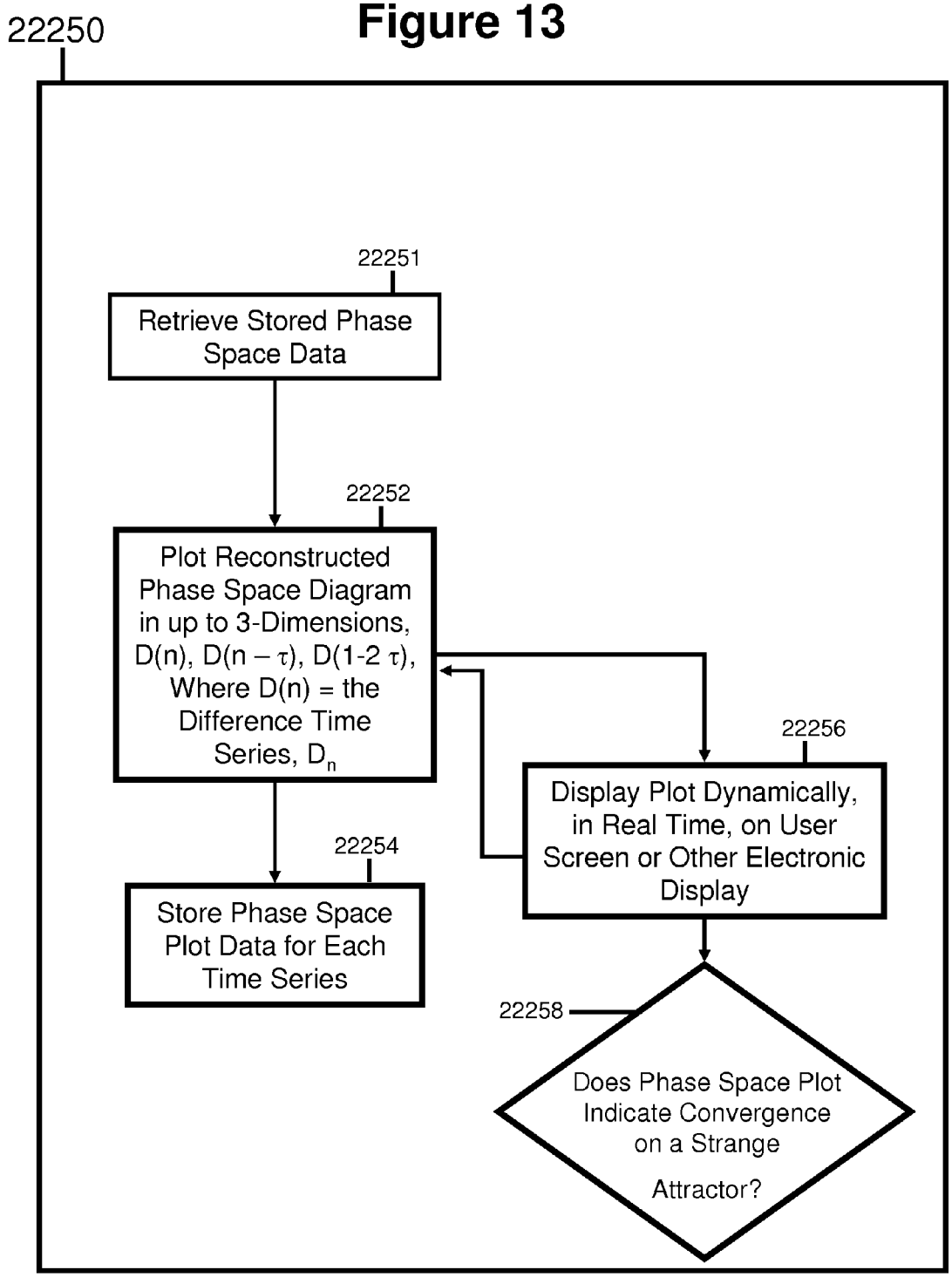
FIG. 13 illustrates the steps involved in the derivation of a Strange Attractor as shown in FIG. 7.
Figure 18:
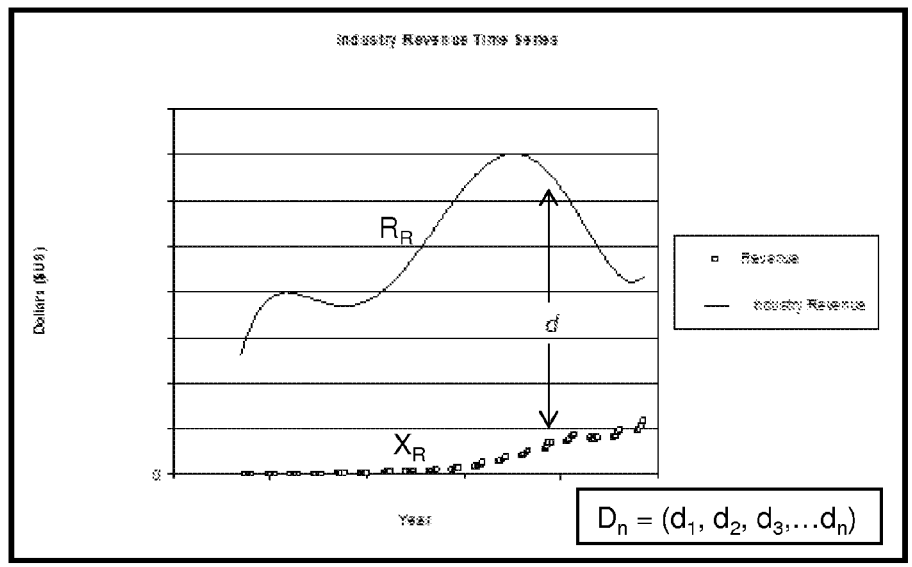
FIG. 18 illustrates a graphical representation of business performance that may be generated as viewable output after the execution of the instant invention when performed through the aid of a computing machine.

FIG. 13 illustrates the step of deriving a strange attractor 22250 of FIG. 7 and the steps comprising this step at a lower level of abstraction. The first step is to retrieve the stored phase space data 22251 and use that to plot a reconstructed phase space diagram (using up to 3 dimensions, Dim=3), wherein each dimension is determined by $D(n)$, $D(n-\tau)$ and $D(1-2\tau)$ for each set of business performance time series data and wherein $D(n)$ is the difference time Series, $D_n$, as illustrated in FIG. 18, and wherein each point on the plotted reconstructed phase space diagram comprises a trajectory that is further analyzed for the presence of nonlinear dynamics. Essentially this step involves taking each difference time series $D_n$ and creating a graph by plotting $(d_1, d_2)$, $(d_2, d_3), \ldots (d_n, d_{(n-\tau)})$, where $\tau$ is the interval distance to the next time series value/time delay. Additional analysis may contain plots using $D(2n-\tau)$ and $D(3n-\tau)$. Note, as previously mentioned, this invention typically uses a value of $\tau=1$, since time series data are uniform. In this manner a phase space plot is a graph comprising $D(n)$ and $D(n-\tau)$ plot point, (also written as $D(n)$, $dD/dn$). The point of this evaluation process is to recognize a grouping pattern in the data around a focal point, otherwise known as an <strange> attractor. When this invention is facilitated by the use of at least one computing machine, the step of plotting these values in a dimension may be done in real time on a user's screen or other electronic display means 22256. After the step of reconstructing the phase space diagram 22252 and after the step of displaying plots in real time on a user screen or other electronic display 22256 the invention's method performs the step of determining if the phase space plot indicates a convergence on a strange attractor 22258. Finally, the phase space plot data for each time series is stored for later use and reference 22254.

Figure 14:
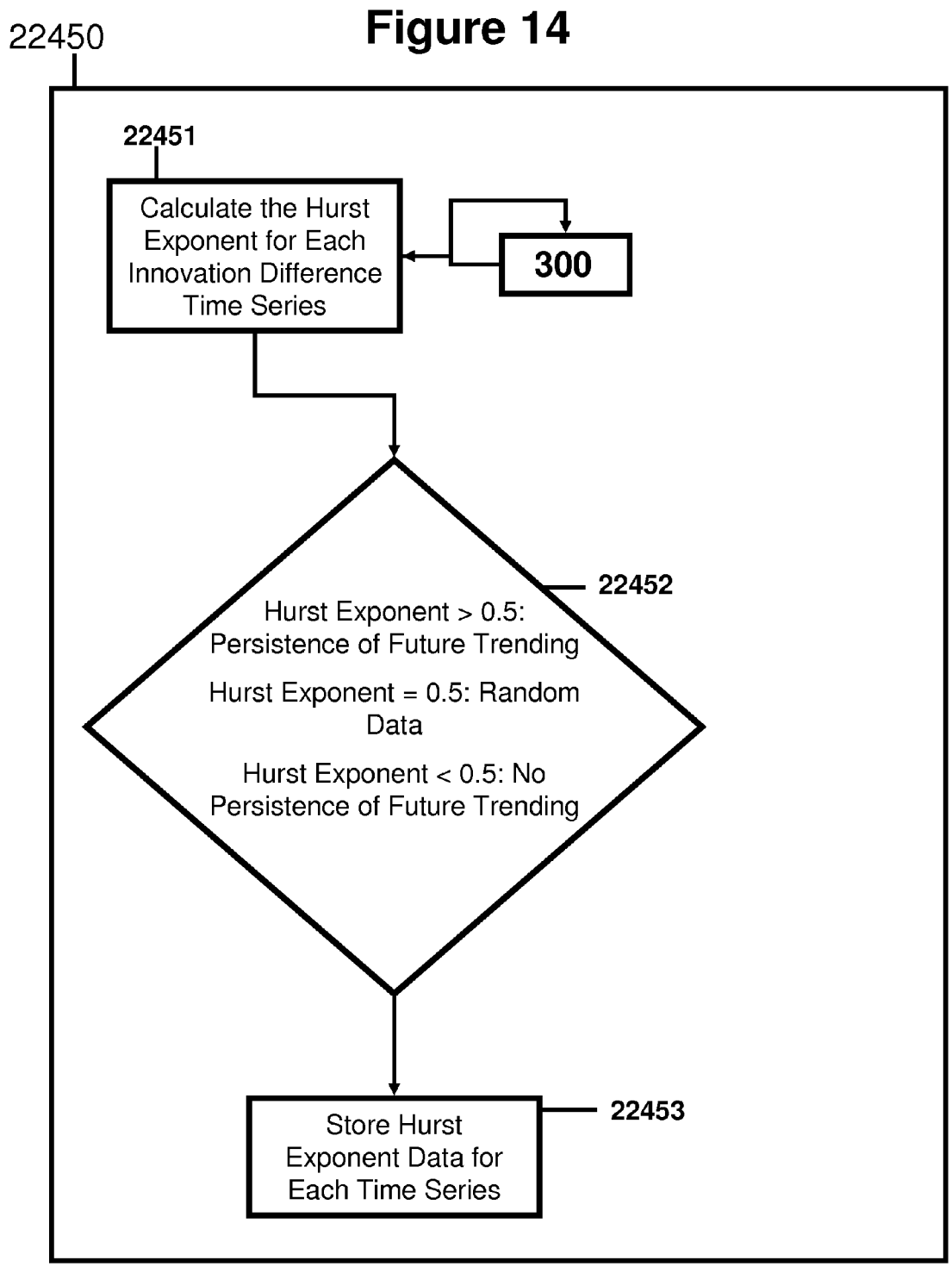
FIG. 14 illustrates the steps involved in the derivation of the Hurst Exponent as shown in FIG. 7.

FIG. 14 illustrates the step of deriving a Hurst exponent indicator 22450 of FIG. 7 and the steps comprising this step at a lower level of abstraction. This step of deriving a Hurst exponent indicator 22450 is performed as a Hurst exponent, H, serves as quantitative measure for an indicator of dynamic nonlinear persistence and therefore can serve as an indicator of the reliability of the trend being determined by the instant invention. This first step in calculating the Hurst exponent indicator 22450 involves calculating the Hurst Exponent 22451 for each set of difference time series innovation data types 300. This is then followed by the step of evaluating the Hurst Exponent and determining if its value is greater then 0.5, indicating persistence of a future dynamic nonlinear trend, if the Hurst Exponent value is less then 0.5, indicating a lack of persistence of a future dynamic nonlinear trend and if the value is equal to 0.5, which indicates random data that is impossible to predict future action 22452. Finally, the Hurst Exponent data for each time series is stored for future reference and use 22453.

These steps to calculate the Hurst exponent are taken as it serves a predictor of how this trend of dynamic nonlinear persistence will continue into the future as Hurst exponents that possess a value less than 0.5 (H<0.5) indicate antipersistence or a negative correlation and thus dynamic nonlinear results tend to reverse in the future and will possibly change the level of disruptive innovation. Conversely, Hurst exponents that have a value greater than 0.5 (H>0.5) indicate a positive correlation and thus show the presence of persistence or, meaning that the level of dynamic nonlinearity will possibly grow in the future. Further, Hurst exponents that have a value equal to 0.5, (H=0), indicates an uncorrelated random walk. This means that the ability to predict future performance of dynamic nonlinearity from the current time series data is likely impossible. Thus, the instant invention, through the calculation of the Hurst exponent, is able to indicate when there is a fair degree of certainty in making business predictions from the current time series data.

Figure 15:
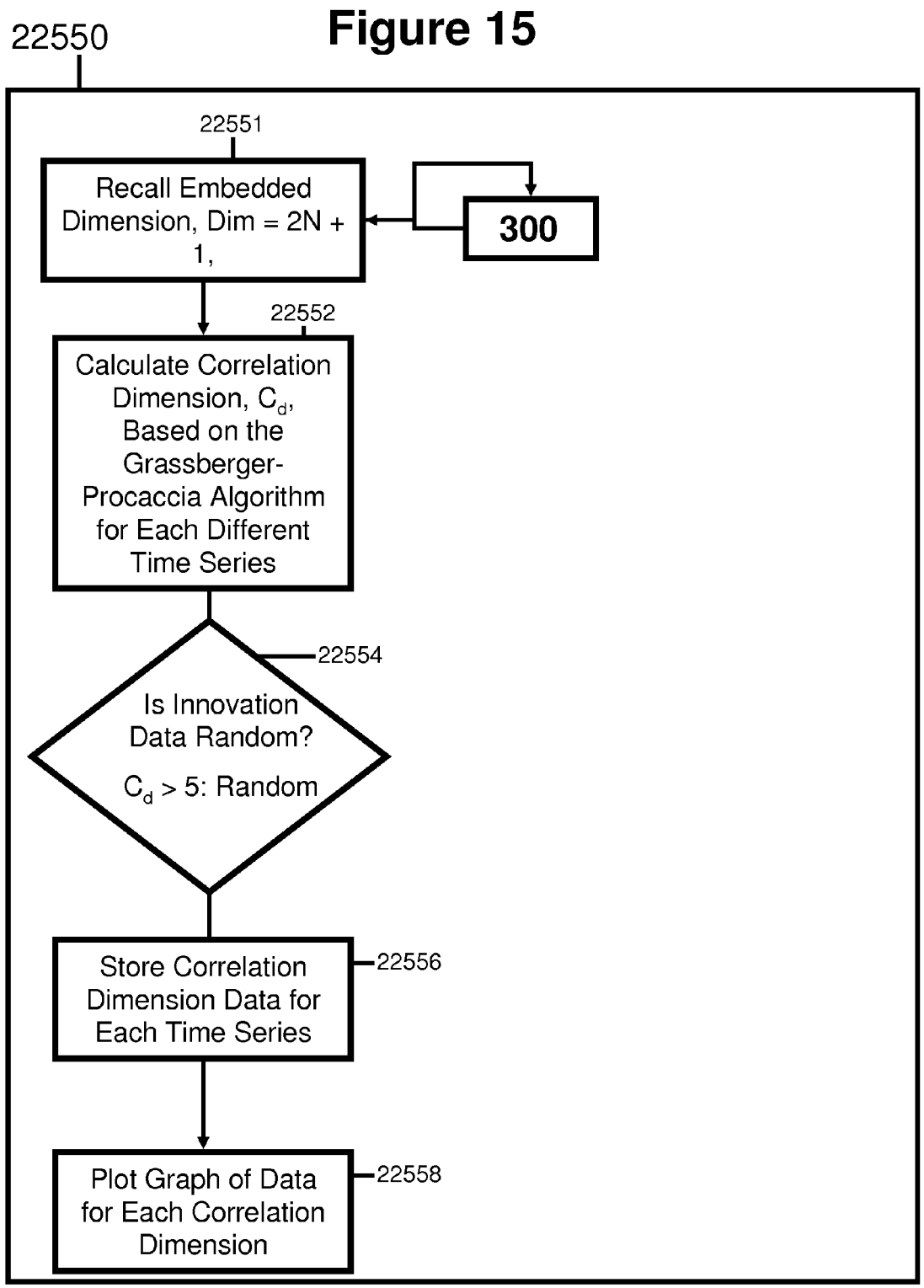
FIG. 15 illustrates the steps involved in the derivation of the correlation dimension as shown in FIG. 7.

FIG. 15 illustrates the step of derivation of Correlation Dimension, ($C_d$) Indicator 22550 of FIG. 7 and the steps comprising this step at a lower level of abstraction in order to test for dynamic nonlinearity. The instant invention estimates the correlation dimension value, wherein the correlation dimension value looks forward and backward in the reconstructed time series counting the number of spheres that fit into the phase space around each reconstructed point. The invention uses the mathematical method based on Grassberger and Procaccia algorithms and the embedded dimension (Dim) to determine $C_d$ which in turn indicates if the data contains dynamic nonlinearity or not (e.g. periodicity or noise).

The steps used by the instant method to perform the derivation of a correlation dimension indicator 22550 involves first obtaining the embedded dimension values, Dim, determined thus far, where Dim=2N+1 for the set of difference time series innovation data types 300. This is followed by steps to calculate the Correlation Dimension, $C_d$, from the Grassberger-Procaccia algorithm for each time series 22552. Specifically, by accessing data points from sets of reconstructed time series data and the Hurst exponent (to evaluate the forward looking trend(s) or randomness of the data) the invention is able to estimate a correlation dimension value for points forward and backward throughout said sets of reconstructed time series data. In this manner, $C_d$=the slope of (log Cr, log r), wherein r is the radius around a point and Cr is the probability that two random points are closer then r. After Cr is calculated the method determines if the data appears to be random, wherein $C_d$ values greater then 5 indicate randomness ($C_d>5$: random) 22554. Next the correlation dimension data is stored for each time series 22556 and data for each correlation dimension may be plotted on a graph 22558. Note that the plotting of data for each correlation dimension 22558 can be performed by utilizing a HARR wavelet plot in order to provide a workable visual representation, thereby allowing the user to assess the structural patterns in the phase space data. Also note that visual clues of structural patterns indicates a greater likelihood of dynamic nonlinearity and therefore the greater the chance that a user may be informed of the likely future effects of the innovation on the market.

Figure 16:
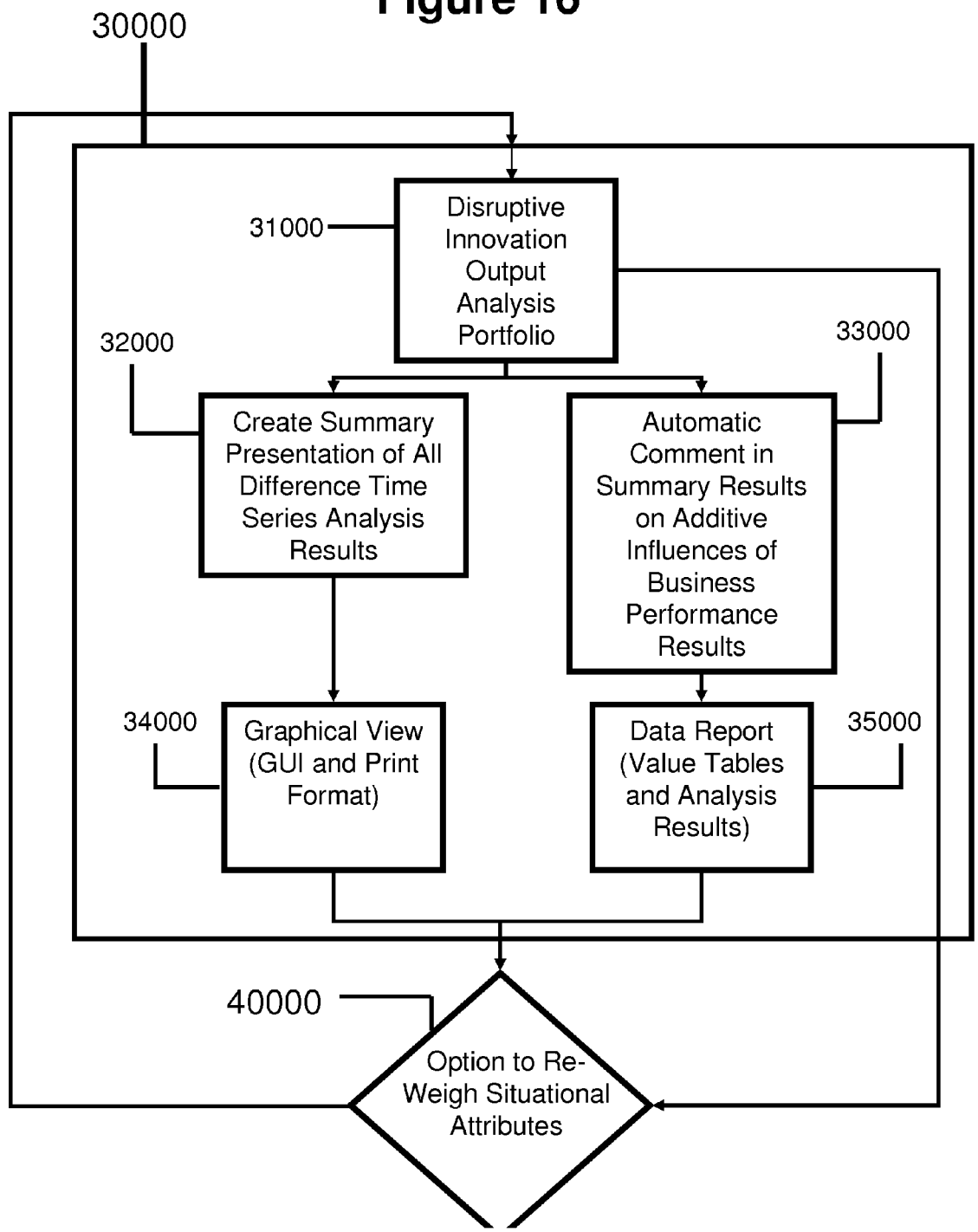
FIG. 16 illustrates the steps involved in the output phase of the instant invention as shown in FIGS. 2 and 3.

FIG. 16 illustrates the output phase 30000 and the steps that comprise the output phase 30000 at a lower level of abstraction in one embodiment of the instant invention, wherein the output phase 30000 of said embodiment is facilitated by the use of at least one computing machine in. The steps of said embodiment comprise first preparing a disruptive innovation output analysis portfolio (electronic file) 31000 for the sets of time series data analyzed in the currently executed run of the instant method invention, wherein said disruptive innovation output analysis portfolio comprises either graphical output data, data report output or both graphical output data and data report output. Such an embodiment of the instant method invention may utilize and artificial neural network, ANN, (such as an ART2) to provide a means of automatically interpreting output results for specific business scenarios from individual and combined results of the analysis methods. FIG. 16 illustrates two substantially concurrent lines of execution followed by the instant method invention to carry out the step of creating a disruptive innovation output analysis portfolio 31000. The first line of said substantially concurrent lines of execution involves creating a summary presentation 32000 for all sets of difference time series innovation data types 300 which is followed by the step of creating graphical visualizations for users to examine (and in some embodiments to allow for the output of such visualizations in hardcopy form) 34000. The second line of said substantially concurrent lines of execution involves producing comments for inclusion of said summary presentation 33000, wherein said comments comprise comment on additive influence of the business performance results. Upon completion of the step of producing comments for inclusion of said summary presentation 33000 said second line of substantially concurrent lines of execution is completed by producing a data report, wherein said data report comprises value tables and analysis results 35000. Finally, the initial output phase is ended by providing the option to reweigh the situation attributes 40000 initially entered by the user during the initialization phase 10000 and rerun the output phase 30000 again with these new weights (the new weighted values and all necessary difference time series innovation data types 100, 200, 300 are then used again in the step of creating a disruptive innovation output analysis portfolio 31000). However, during the step of providing an option to the user to reweigh the situational attributes 40000, should the user decide to not reweigh the situation attributes, the method invention ends its execution. Note that the summary data utilized in this embodiment must be generated in a time series format. Also note, through the use of at least one computing machine an ANN may allow various methods for users to reweigh situational attributes.

In addition, some embodiments of the instant method invention may provided an option to process multiple sets of situational attributes to be run through the instant method invention and receive output analysis for each set of these situational attributes upon termination of execution of said instant method invention. In this manner the step of providing an option to the user to reweigh the situational attributes 40000 will automatically be selected as affirmative and will loop through the execution of the output phase, generating all necessary disruptive innovation output analysis portfolios, until the final set of situational attributes has been processed.

Figure 17:
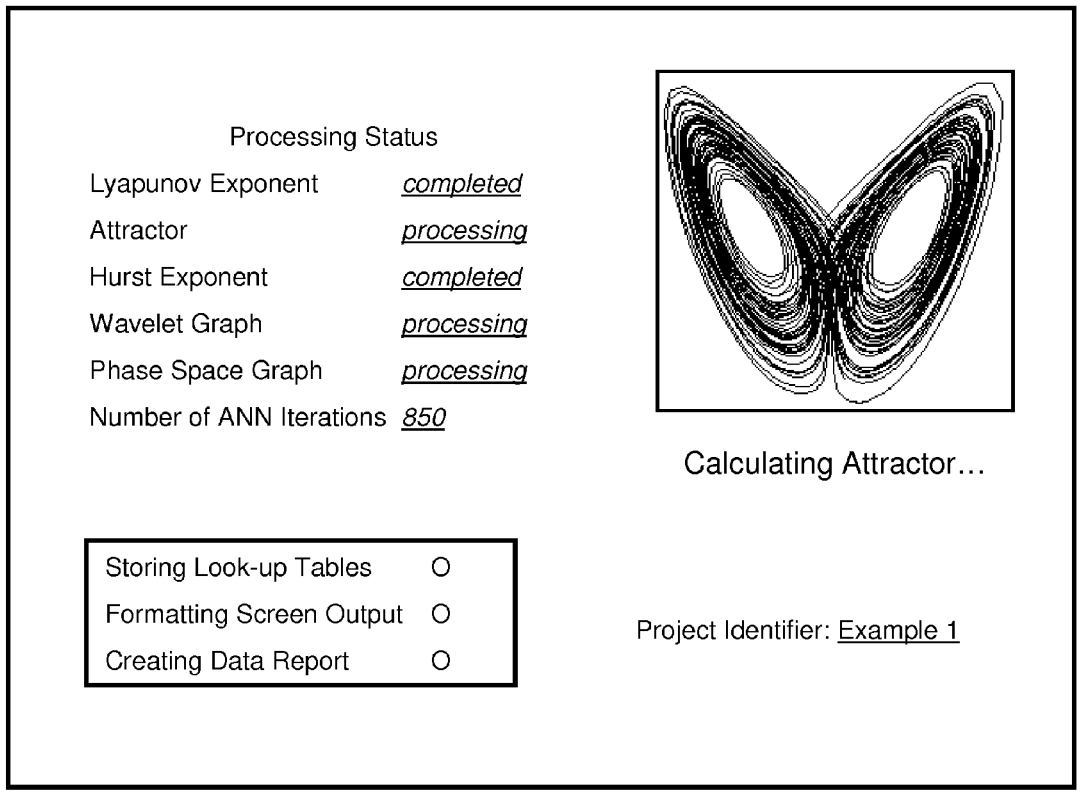
FIG. 17 illustrates a sample screen of the output that a user may view after the instant invention has been performed through the aid of a computing machine.

FIGS. 17, 18 and 19 illustrate examples of screens for embodiments of the instant method invention, wherein the phases and their component steps may be facilitated by the use of at least one computing machine. FIG. 17 illustrates one possible example of an output summary that may be a component part of a disruptive innovation output analysis portfolio, revealing a table summary of completed analysis information, a visual depiction of a strange attractor found and some user follow up options. FIG. 18 illustrates another possible example of an output summary that may be a part of a disruptive innovation output analysis, illustrating a graph showing the difference caused by the disruptive innovation within the marketplace. FIG. 19 illustrates a possible screen shot of how a user situational reweighing tool might appear.

What is claimed is:

1. A method of detecting disruptive business process innovations comprising the steps of:
    performing an initialization phase comprising the steps of
        gathering a quantity of time series data, wherein said step of gathering said quantity of time series data time series data comprises the steps of:
        gathering a quantity of expected research and development time series data;
        gathering a quantity of reference research and development time series data;
        gathering a quantity of expected revenue time series data;
        gathering a quantity of reference revenue and development time series data;

gathering a quantity of expected operations expense time series data;
gathering a quantity of reference operations expense time series data;
gathering a quantity of expected time cycle time series data;
gathering a quantity of reference time cycle time series data;
performing a processing phase using a computing machine comprising the steps of:
creating at least one set of time series data;
performing dynamic nonlinear analysis using said at least one set of time series data;
applying a learning method to analyze said time series data;
performing an output phase comprising the steps of:
creating a disruptive innovation output analysis portfolio; and
performing an option to perform said processing phase and said output phase again with different situational attributes;
wherein said initialization phase further comprises the step of storing said time series data and, wherein said step of performing dynamic nonlinear analysis using said at least one set of time series data further comprises the steps of:
deriving a Lyapunov exponent from said at least one set of time series data;
deriving the presence of a strange attractor from said Lyapunov exponent and from said at least one set of time series data;
deriving a Hurst exponent from said at least one set of time series data;
deriving the correlation dimension from said Hurst exponent and from said at least one set of time series data;
creating a graphic from said time series data; and
wherein said step of creating sets of time series data comprises the steps of:
performing data integrity checks on said at least one set of time series data, wherein said step of performing data integrity checks comprises the steps of:
identifying data problems; and
remedying said data problems.

2. The method of detecting disruptive business process innovations of claim 1, wherein said step of creating sets of time series data comprises the steps of:
performing data integrity checks on said at least one set of time series data, wherein said step of performing data integrity checks on said at least one set of time series data comprises the steps of:
identifying data problems;
and remedying said data problems.

3. The method of detecting disruptive business process innovations of claim 2, wherein said step of performing data integrity checks on said at least one set of time series data further comprises the steps of:
performing data smoothing on said at least one set of time series data;
performing a smoothing validation test on said at least one set of time series data after data smoothing; and
performing the creation of at least one unique set of difference time series data.

4. The method of detecting disruptive business process innovations of claim 3, wherein said step to perform data integrity checks on said at least one set of time series data further comprises the steps of:
performing data smoothing on said at least one set of time series data;
performing a smoothing validation test on said at least one set of time series data substantially subsequent to said step of performing data smoothing; and
performing the creation of at least one unique set of difference time series data.

5. A method of detecting disruptive business process innovations comprising the steps of:
performing an initialization phase comprising the steps of gathering time series data, wherein said step of gathering time series data comprises the steps of:
entering expected research and development time series data into at least one computing machine;
entering reference research and development time series data into at least one computing machine;
entering expected revenue time series data into at least one computing machine;
entering reference revenue and development time series data into at least one computing machine;
entering expected operations expense time series data into at least one computing machine;
entering reference operations expense time series data into at least one computing machine;
entering expected time cycle time series data into at least one computing machine;
entering reference time cycle time series data into at least one computing machine;
performing a processing phase comprising the steps of:
creating at least one set of time series data facilitated by the aid of at least one computing machine;
performing dynamic nonlinear analysis using said at least one set of time series data facilitated by the aid of at least one computing machine;
applying a learning method to analyze said time series data facilitated by the aid of at least one computing machine;
performing an output phase comprising the steps of:
creating a disruptive innovation output analysis portfolio facilitated by the aid of at least one computing machine; and
performing an option to perform said processing phase and said output phase again with different situational attributes facilitated by the aid of at least one computing machine;
wherein said initialization phase further comprises the step of storing said time series data facilitated by the aid of at least one computing machine and, wherein said step of performing dynamic nonlinear analysis using said at least one set of time series data further comprises the steps of:
deriving a Lyapunov exponent from said at least one set of time series data facilitated by the aid of at least one computing machine;
deriving the presence of a strange attractor from said Lyapunov exponent and from said at least one set of time series data facilitated by the aid of at least one computing machine;
deriving a Hurst exponent from said at least one set of time series data facilitated by the aid of at least one computing machine;
deriving the correlation dimension from said Hurst exponent and from said at least one set of time series data facilitated by the aid of at least one computing machine; and
creating a graphic from said time series data facilitated by the aid of at least one computing machine; and wherein said step of creating sets of time series data comprises the steps of:
  performing data integrity checks on said at least one set of time series data facilitated by the aid of at least one computing machine, wherein said step of performing data integrity checks comprises the steps of:
    identifying data problems facilitated by the aid of at least one computing machine; and
    remedying said data problems facilitated by the aid of at least one computing machine.

6. The method of detecting disruptive business process innovations of claim 5, wherein said step of creating sets of time series data comprises the steps of performing a data integrity check on said at least one set of time series data, wherein said step of performing a data integrity check on said at least one set of time series data comprises the steps of identifying data problems and remedying said data problems facilitated by the aid of at least one computing machine.

7. The method of detecting disruptive business process innovations of claim 6, wherein said step to perform data integrity checks on said at least one set of time series data further comprises the steps of:
  performing data smoothing on said at least one set of time series data facilitated by the aid of at least one computing machine;
  performing a smoothing validation test on said at least one set of time series data substantially subsequent to said step of performing data smoothing facilitated by the aid of at least one computing machine; and
    performing the creation of at least one unique set of difference time series data facilitated by the aid of at least one computing machine.

8. The method of detecting disruptive business process innovations of claim 7, wherein said step to perform data integrity checks on said at least one set of time series data facilitated by the aid of at least one computing machine further comprises the steps of:
  performing data smoothing on said at least one set of time series data facilitated by the aid of at least one computing machine;
  performing a smoothing validation test on said at least one set of time series data facilitated by the aid of at least one computing machine; and
  performing the creation of at least one unique set of difference time series data facilitated by the aid of at least one computing machine.

9. A method of detecting disruptive business process innovations utilizing nonlinear dynamic analysis performed by the aid of at least one computing machine comprising the steps of:
  performing an initialization phase comprising the steps of gathering time series data, wherein said step of gathering time series data comprises:
    entering expected research and development time series data into at least one computing machine;
    entering reference research and development time series data into at least one computing machine;
    entering expected revenue time series data into at least one computing machine;
    entering reference revenue and development time series data into at least one computing machine;
    entering expected operations expense time series data into at least one computing machine;
    entering reference operations expense time series data into at least one computing machine;
    entering expected time cycle time series data into at least one computing machine;
    entering reference time cycle time series data into at least one computing machine;
    storing said time series data into a at least one database, wherein said at least one database exists on at least one computing machine;
  performing a processing phase comprising the steps of:
    accessing said time series data from said at least one database facilitated by the aid of at least one computing machine;
    creating at least one set of time series data facilitated by the aid of at least one computing machine;
    performing dynamic nonlinear analysis using said at least one set of time series data and storing the results on said at least one database facilitated by the aid of at least one computing machine;
    applying a learning method to analyze said time series data and storing the results on said at least one database facilitated by the aid of at least one computing machine;
  performing an output phase comprising the steps of:
    creating a disruptive innovation output analysis portfolio and storing said disruptive innovation output analysis portfolio on said at least one database facilitated by the aid of at least one computing machine; and
  performing an option to perform said processing phase and said output phase again with different situational attributes facilitated by the aid of at least one computing machine;
  wherein said initialization phase further comprises the step of storing said time series data in said at least one database facilitated by the aid of at least one computing machine and, wherein said step of performing dynamic nonlinear analysis using said at least one set of time series data further comprises the steps of:
    deriving a Lyapunov exponent from said at least one set of time series data and storing the result in said at least one database facilitated by the aid of at least one computing machine;
    deriving the presence of a strange attractor from said Lyapunov exponent and from said at least one set of time series data and storing the result in said at least one database facilitated by the aid of at least one computing machine;
    deriving a Hurst exponent from said at least one set of time series data and storing the result in said at least one database facilitated by the aid of at least one computing machine;
    deriving the correlation dimension from said Hurst exponent and from said at least one set of time series data and storing the result in said at least one database facilitated by the aid of at least one computing machine; and
    creating a graphic from said time series data and storing the result in said at least one database facilitated by the aid of at least one computing machine; and
  wherein said step of creating sets of time series data comprises the steps of:
    performing data integrity checks on said at least one set of time series data and storing the result in said at least one database facilitated by the aid of at least one computing machine, wherein said step of performing data integrity checks comprises the steps of:
      identifying data problems facilitated by the aid of at least one computing machine; and
      remedying said data problems facilitated by the aid of at least one computing machine.

10. The method of detecting disruptive business process innovations utilizing nonlinear dynamic analysis performed by the aid of at least one computing machine of claim 9, wherein said step of creating sets of time series data comprises the steps of performing a data integrity check on said at least one set of time series data, wherein said step of performing a data integrity check on said at least one set of time series data comprises the steps of identifying data problems and remedying said data problems and storing the results in said at least one database facilitated by the aid of at least one computing machine.

11. The method of detecting disruptive business process innovations utilizing nonlinear dynamic analysis performed by the aid of at least one computing machine of claim 10, wherein said step to perform data integrity checks on said at least one set of time series data further comprises the steps of:
- performing data smoothing on said at least one set of time series data facilitated by the aid of at least one computing machine;
- performing a smoothing validation test on said at least one set of time series data substantially after said step of performing data smoothing facilitated by the aid of at least one computing machine and storing the results of in said at least one database; and
- performing the creation of at least one unique set of difference time series data facilitated by the aid of at least one computing machine and storing said at least one unique set of difference time series data in said at least one database.

12. The method of detecting disruptive business process innovations utilizing nonlinear dynamic analysis performed by the aid of at least one computing machine of claim 11, wherein said step to perform data integrity checks on said at least one set of time series data substantially subsequent to said step of performing data smoothing facilitated by the aid of at least one computing machine further comprises the steps of:
- performing data smoothing on said at least one set of time series data and storing the result in said at least one database facilitated by the aid of at least one computing machine;
- performing a smoothing validation test on said at least one set of time series data and storing the result in said at least one database facilitated by the aid of at least one computing machine; and
- performing the creation of at least one unique set of difference time series data and storing the result in said at least one database facilitated by the aid of at least one computing machine.

13. The method of detecting disruptive business process innovations utilizing nonlinear dynamic analysis performed by the aid of at least one computing machine of claim 12, wherein said step to derive a Lyapunov exponent further comprises the steps of:
- setting a time delay value and storing the result in said at least one database facilitated by the aid of at least one computing machine;
- setting a value for an embedded dimension storing the result in said at least one database facilitated by the aid of at least one computing machine;
- calculating the phase space storing the result in said at least one database facilitated by the aid of at least one computing machine;
- finding the slope of the linear fit storing the result in said at least one database facilitated by the aid of at least one computing machine; and
- identifying the largest Lyapunov exponent and determining if dynamic nonlinearity is indicated and storing the result in said at least one database facilitated by the aid of at least one computing machine.

14. The method of detecting disruptive business process innovations utilizing nonlinear dynamic analysis performed by the aid of at least one computing machine of claim 13, wherein said step to calculate the phase space further comprises the steps of:
- calculating the embedded dimension Dim for $D(n-\tau)$ for each set of difference time series innovation data types;
- calculating the embedded dimension Dim for $D(1-2\tau)$ for each set of difference time series innovation data types; and
- storing the result of the steps of calculating the embedded dimension Dim for $D(n-\tau)$ and $D(1-2\tau)$ for each set of difference time series innovation data types in said at least one database facilitated by the aid of at least one computing machine.

* * * * *